(12) United States Patent
Zhang et al.

(10) Patent No.: US 12,468,184 B2
(45) Date of Patent: Nov. 11, 2025

(54) HIGH PERFORMANCE OPTICAL MODULATORS AND DRIVERS

(71) Applicant: HyperLight Corporation, Cambridge, MA (US)

(72) Inventors: Mian Zhang, Cambridge, MA (US); Christian Reimer, Wellesley, MA (US); Prashanta Kharel, Cambridge, MA (US)

(73) Assignee: HyperLight Corporation, Cambridge, MA (US)

( * ) Notice: Subject to any disclaimer, the term of this patent is extended or adjusted under 35 U.S.C. 154(b) by 0 days.

(21) Appl. No.: 17/335,915

(22) Filed: Jun. 1, 2021

(65) Prior Publication Data

US 2021/0373364 A1 Dec. 2, 2021

Related U.S. Application Data

(60) Provisional application No. 63/033,666, filed on Jun. 2, 2020.

(51) Int. Cl.
*G02F 1/035* (2006.01)
*G02F 1/225* (2006.01)
*G02B 6/12* (2006.01)

(52) U.S. Cl.
CPC .......... *G02F 1/0356* (2013.01); *G02F 1/2255* (2013.01); *G02B 2006/12142* (2013.01); *G02F 2201/127* (2013.01); *G02F 2202/20* (2013.01)

(58) Field of Classification Search
CPC ................. G02F 1/0356; G02F 1/2255; G02F 2201/127; G02F 2202/20; G02B 2006/12142

(Continued)

(56) References Cited

U.S. PATENT DOCUMENTS 3,877,782 A 4/1975 Kaminow
4,005,927 A 2/1977 Caton
(Continued)

FOREIGN PATENT DOCUMENTS

CN 1432846 7/2003
CN 101006382 7/2007
(Continued)

OTHER PUBLICATIONS

"Monolithic integration of a lithium niobate microresonator with a free-standing waveguide using femtosecond laser assisted ion beam writing" by Fang et al, Nature, Scientific Reports; 7:45610, pp. 1-6 (Year: 2017).*

(Continued)

*Primary Examiner* — Robert Tavlykaev
(74) *Attorney, Agent, or Firm* — Van Pelt, Yi & James LLP

(57) ABSTRACT

An interface for an optical modulator and the optical modulator are described. The interface includes first and second differential line pairs. The first differential line pair has a first negative line and a first positive line arranged on opposing sides of a first waveguide. The first negative line is on a distal side of the first waveguide relative to a second waveguide. The first positive line is on a proximal side of the first waveguide relative to the second waveguide. The second differential line pair has a second negative line and a second positive line arranged on opposing sides of the second waveguide. The second negative line is on a distal side of the second waveguide relative to the first waveguide. The second positive line is on a proximal side of the second waveguide relative to the first waveguide. The first and second waveguides each include lithium niobate and/or lithium tantalate.

28 Claims, 7 Drawing Sheets

(58) Field of Classification Search
USPC .................................................... 385/1–3
See application file for complete search history.

(56) References Cited

U.S. PATENT DOCUMENTS

| | | | |
|---|---|---|---|
| 4,251,130 A | 2/1981 | Marcatili | |
| 4,372,643 A | 2/1983 | Liu | |
| 4,380,364 A | 4/1983 | Marcatili | |
| 4,448,479 A | 5/1984 | Alferness | |
| 4,468,086 A | 8/1984 | Liu | |
| 4,553,810 A | 11/1985 | Alferness | |
| 5,263,102 A | 11/1993 | Hakogi | |
| 5,566,257 A | 10/1996 | Jaeger | |
| 5,619,607 A | 4/1997 | Djupsjobacka | |
| 5,671,302 A | 9/1997 | Skeie | |
| 5,675,673 A | 10/1997 | Skeie | |
| 5,696,855 A | 12/1997 | Skeie | |
| 5,757,985 A | 5/1998 | Ishizaka | |
| 6,129,864 A * | 10/2000 | Imaeda | G02B 6/13 264/1.21 |
| 6,172,791 B1 | 1/2001 | Gill | |
| 6,192,167 B1 * | 2/2001 | Kissa | G02F 1/0356 385/2 |
| 6,310,700 B1 | 10/2001 | Betts | |
| 6,483,953 B1 | 11/2002 | McBrien | |
| 6,501,867 B2 | 12/2002 | Gates, II | |
| 6,522,793 B1 * | 2/2003 | Szilagyi | G02F 1/225 385/2 |
| 6,567,203 B1 * | 5/2003 | Hill | G02F 1/2255 359/254 |
| 6,580,840 B1 | 6/2003 | McBrien | |
| 6,647,158 B2 | 11/2003 | Betts | |
| 6,678,430 B1 | 1/2004 | Noe | |
| 6,760,493 B2 | 7/2004 | Pruneri | |
| 6,950,580 B2 * | 9/2005 | Mitomi | G02F 1/2255 385/40 |
| 6,958,852 B2 * | 10/2005 | Aoki | G02F 1/2255 359/315 |
| 7,027,668 B2 | 4/2006 | Tavlykaev | |
| 7,035,485 B2 * | 4/2006 | Kondo | G02F 1/0305 385/40 |
| 7,082,237 B2 | 7/2006 | Walker | |
| 7,242,821 B2 | 7/2007 | Bull | |
| 7,382,943 B1 | 6/2008 | Heaton | |
| 7,400,787 B2 * | 7/2008 | Burns | G02F 1/2255 385/3 |
| 7,426,321 B2 | 9/2008 | Eriksson | |
| 7,426,326 B2 | 9/2008 | Moeller | |
| 7,433,111 B2 | 10/2008 | Sasaki | |
| 7,447,389 B2 | 11/2008 | Sugiyama | |
| 7,492,975 B2 | 2/2009 | Toyoda | |
| 7,502,530 B2 * | 3/2009 | Kondo | G02F 1/0356 385/40 |
| 7,555,174 B2 | 6/2009 | Kuver | |
| 7,657,130 B2 | 2/2010 | Shastri | |
| 7,801,400 B2 * | 9/2010 | Sugiyama | G02F 1/035 385/32 |
| 7,809,216 B2 | 10/2010 | Cox, III | |
| 7,869,669 B2 | 1/2011 | Mitomi | |
| 7,899,277 B2 | 3/2011 | Koh | |
| 8,094,359 B1 | 1/2012 | Matsko | |
| 8,175,422 B2 | 5/2012 | Okazaki | |
| 8,280,201 B2 | 10/2012 | Prosyk | |
| 8,300,992 B2 | 10/2012 | Murata | |
| 8,411,353 B2 | 4/2013 | Kashyap | |
| 8,417,073 B2 | 4/2013 | Li | |
| 8,428,399 B2 | 4/2013 | Takabayashi | |
| 8,530,821 B2 | 9/2013 | Green | |
| 8,549,740 B1 | 10/2013 | Hwu | |
| 8,582,928 B2 | 11/2013 | Miyatake | |
| 8,644,647 B2 | 2/2014 | Ichikawa | |
| 8,644,648 B2 | 2/2014 | Ho | |
| 8,737,773 B2 | 5/2014 | Motoya | |
| 8,805,127 B2 | 8/2014 | Miyatake | |
| 8,903,202 B1 | 12/2014 | Prosyk | |
| 8,917,958 B2 | 12/2014 | Prosyk | |
| 8,983,241 B2 | 3/2015 | Li | |
| 9,008,469 B2 | 4/2015 | Prosyk | |
| 9,042,684 B2 | 5/2015 | Gill | |
| 9,070,815 B2 | 6/2015 | Lee | |
| 9,158,175 B2 | 10/2015 | Kung | |
| 9,170,439 B2 | 10/2015 | Gill | |
| 9,310,663 B2 | 4/2016 | Velthaus | |
| 9,335,568 B1 | 5/2016 | Yap | |
| 9,417,469 B2 | 8/2016 | Abel | |
| 9,470,952 B2 | 10/2016 | Dagli | |
| 9,482,925 B2 | 11/2016 | Prosyk | |
| 9,523,871 B2 | 12/2016 | Kitamura | |
| 9,638,980 B2 | 5/2017 | Yagi | |
| 9,664,931 B1 | 5/2017 | Yap | |
| 9,671,670 B2 | 6/2017 | Hollis | |
| 9,703,127 B2 | 7/2017 | Abel | |
| 9,733,543 B2 | 8/2017 | Dagli | |
| 9,741,645 B2 | 8/2017 | Hu | |
| 9,742,498 B1 * | 8/2017 | Nagarajan | H04B 10/524 |
| 9,746,743 B1 | 8/2017 | Rabiei | |
| 9,804,475 B1 | 10/2017 | Parker | |
| 9,939,709 B2 | 4/2018 | Iwatsuka | |
| 10,007,167 B1 | 6/2018 | Parker | |
| 10,018,888 B2 | 7/2018 | Thaniyavarn | |
| 10,027,032 B2 | 7/2018 | Kirino | |
| 10,088,734 B2 | 10/2018 | Kondou | |
| 10,133,142 B2 | 11/2018 | Doerr | |
| 10,168,596 B2 | 1/2019 | Williams | |
| 10,197,884 B2 | 2/2019 | Dagli | |
| 10,241,379 B1 | 3/2019 | Parker | |
| 10,247,998 B2 | 4/2019 | Velthaus | |
| 10,295,844 B2 | 5/2019 | Kissa | |
| 10,320,083 B2 | 6/2019 | Kirino | |
| 10,367,664 B2 * | 7/2019 | Welch | H04B 10/60 |
| 10,409,093 B2 | 9/2019 | Nejadmalayeri | |
| 10,705,354 B2 | 7/2020 | Menezo | |
| 10,888,875 B2 | 1/2021 | Oh | |
| 10,890,787 B2 | 1/2021 | Kawamura | |
| 10,976,637 B2 | 4/2021 | Parker | |
| 11,009,659 B2 | 5/2021 | Ward | |
| 11,287,720 B2 * | 3/2022 | Hayashi | G02F 1/2255 |
| 11,448,907 B2 * | 9/2022 | Tai | G02F 1/035 |
| 11,567,353 B2 | 1/2023 | Kharel | |
| 11,668,994 B2 | 6/2023 | Parker | |
| 2001/0008589 A1 | 7/2001 | Sasame | |
| 2002/0048076 A1 * | 4/2002 | Kondo | G02F 1/0356 359/322 |
| 2002/0071622 A1 | 6/2002 | Betts | |
| 2002/0154842 A1 | 10/2002 | Betts | |
| 2002/0159666 A1 | 10/2002 | John, II | |
| 2003/0002766 A1 * | 1/2003 | Pruneri | G02F 1/225 385/40 |
| 2003/0228081 A1 | 12/2003 | Tavlykaev | |
| 2005/0123242 A1 | 6/2005 | Walker | |
| 2006/0051019 A1 | 3/2006 | Sasaki | |
| 2006/0067634 A1 | 3/2006 | Bull | |
| 2006/0228065 A1 | 10/2006 | Burns | |
| 2006/0251425 A1 | 11/2006 | Kupershmidt | |
| 2007/0009195 A1 | 1/2007 | Eriksson | |
| 2007/0058896 A1 | 3/2007 | Toyoda | |
| 2007/0211984 A1 | 9/2007 | Gopinath | |
| 2007/0242915 A1 | 10/2007 | Kuver | |
| 2008/0031564 A1 | 2/2008 | Sugiyama | |
| 2008/0089633 A1 * | 4/2008 | Moeller | G02F 1/0356 385/2 |
| 2008/0193076 A1 | 8/2008 | Witzens | |
| 2008/0227410 A1 * | 9/2008 | Cox | H04B 10/505 455/82 |
| 2009/0093982 A1 | 4/2009 | Kissa | |
| 2009/0103850 A1 | 4/2009 | Shastri | |
| 2009/0290830 A1 | 11/2009 | Mitomi | |
| 2009/0297088 A1 | 12/2009 | Koh | |
| 2010/0067840 A1 | 3/2010 | Sugiyama | |
| 2010/0098424 A1 | 4/2010 | Ho | |
| 2010/0158540 A1 | 6/2010 | Takabayashi | |
| 2010/0166356 A1 | 7/2010 | Okazaki | |
| 2010/0195953 A1 | 8/2010 | Miyatake | |

(56) References Cited

U.S. PATENT DOCUMENTS

| | | |
|---|---|---|
| 2010/0232736 A1 | 9/2010 | Ichikawa |
| 2011/0038034 A1 | 2/2011 | Kashyap |
| 2011/0069924 A1 | 3/2011 | Murata |
| 2011/0135242 A1 | 6/2011 | Prosyk |
| 2011/0158576 A1 | 6/2011 | Kissa |
| 2011/0262071 A1 | 10/2011 | Mitomi |
| 2011/0298561 A1 | 12/2011 | Green |
| 2012/0045162 A1 | 2/2012 | Li |
| 2012/0230627 A1 | 9/2012 | Motoya |
| 2012/0301071 A1 | 11/2012 | Kung |
| 2013/0163913 A1* | 6/2013 | Prosyk .................. G02F 1/035 385/3 |
| 2013/0266257 A1 | 10/2013 | Li |
| 2014/0034602 A1 | 2/2014 | Tetsuya |
| 2014/0035134 A1 | 2/2014 | Chuan |
| 2014/0055838 A1 | 2/2014 | Lee |
| 2014/0061450 A1 | 3/2014 | Gill |
| 2014/0064653 A1 | 3/2014 | Gill |
| 2014/0104666 A1* | 4/2014 | Minoia ............ H03K 19/018521 359/245 |
| 2014/0153860 A1 | 6/2014 | Prosyk |
| 2014/0199014 A1 | 7/2014 | Velthaus |
| 2015/0036965 A1 | 2/2015 | Prosyk |
| 2015/0043865 A1 | 2/2015 | Velthaus |
| 2015/0147038 A1* | 5/2015 | Asai ................... G02F 1/3501 385/122 |
| 2015/0309340 A1 | 10/2015 | Abel |
| 2016/0011439 A1 | 1/2016 | Kitamura |
| 2016/0026063 A1 | 1/2016 | Yagi |
| 2016/0062155 A1 | 3/2016 | Ichikawa |
| 2016/0139485 A1 | 5/2016 | Winzer |
| 2016/0139486 A1 | 5/2016 | Dagli |
| 2016/0202592 A1 | 7/2016 | Hollis |
| 2016/0291352 A1 | 10/2016 | Kissa |
| 2016/0313579 A1 | 10/2016 | Yokoyama |
| 2016/0349546 A1 | 12/2016 | Abel |
| 2017/0023842 A1 | 1/2017 | Dagli |
| 2017/0052424 A1 | 2/2017 | Iwatsuka |
| 2017/0082877 A1 | 3/2017 | Arimoto |
| 2017/0110802 A1 | 4/2017 | Kirino |
| 2017/0250758 A1 | 8/2017 | Kikuchi |
| 2017/0285437 A1 | 10/2017 | Doerr |
| 2017/0307954 A1 | 10/2017 | Dagli |
| 2018/0120666 A1 | 5/2018 | Kondou |
| 2018/0301819 A1 | 10/2018 | Kirino |
| 2018/0309207 A1 | 10/2018 | Kirino |
| 2018/0329269 A1 | 11/2018 | Ward |
| 2018/0341164 A1* | 11/2018 | Williams ............. G02F 1/2255 |
| 2018/0361400 A1 | 12/2018 | Oh |
| 2019/0018262 A1 | 1/2019 | Nejadmalayeri |
| 2019/0025615 A1 | 1/2019 | Kawamura |
| 2019/0171084 A1 | 6/2019 | Parker |
| 2019/0196099 A1 | 6/2019 | Watanuki |
| 2019/0227350 A1 | 7/2019 | Puckett |
| 2019/0243167 A1 | 8/2019 | Menezo |
| 2019/0293972 A1* | 9/2019 | Sasaki .................. G02B 6/122 |
| 2019/0296443 A1 | 9/2019 | Kirino |
| 2019/0346625 A1 | 11/2019 | Cheng |
| 2019/0391415 A1 | 12/2019 | Lipson |
| 2021/0080796 A1* | 3/2021 | Kissa .................... G02F 1/011 |
| 2021/0157177 A1 | 5/2021 | Kharel |
| 2021/0215992 A1 | 7/2021 | Parker |
| 2021/0364696 A1* | 11/2021 | Reano ............... G02B 6/12002 |
| 2021/0373364 A1 | 12/2021 | Zhang |
| 2022/0146901 A1* | 5/2022 | Miyazaki ............. G02F 1/2255 |
| 2022/0197104 A1* | 6/2022 | Miyazaki ............. G02F 1/035 |
| 2023/0273467 A1 | 8/2023 | Ozaki |

FOREIGN PATENT DOCUMENTS

| | | | | |
|---|---|---|---|---|
| CN | 102445771 | 5/2012 | | |
| CN | 107478861 | 12/2017 | | |
| CN | 109844621 | 6/2019 | | |
| CN | 110609399 | 12/2019 | | |
| CN | 111812867 | 10/2020 | | |
| CN | 111061071 | 9/2021 | | |
| EP | 0152996 | 8/1985 | | |
| JP | H09211402 | 8/1997 | | |
| JP | 2001066561 | 3/2001 | | |
| JP | 2004341147 | 12/2004 | | |
| JP | 2005506554 | 3/2005 | | |
| JP | 2006065044 | 3/2006 | | |
| JP | 2007171452 | 7/2007 | | |
| JP | 2007304424 | 11/2007 | | |
| JP | 2009048021 | 3/2009 | | |
| JP | 2014-142411 A | * | 8/2014 | ............ G02F 1/035 |
| JP | 2015118371 | 6/2015 | | |
| JP | 2017-129834 A | * | 7/2017 | ............ G02F 1/035 |
| JP | 2019174749 | 10/2019 | | |
| KR | 20040017535 | 2/2004 | | |
| WO | 2008108154 | 9/2008 | | |
| WO | 2018031916 | 2/2018 | | |
| WO | 2019180922 | 9/2019 | | |
| WO | 2019213140 | 11/2019 | | |
| WO | 2023045610 | 3/2023 | | |

OTHER PUBLICATIONS

"High-Speed Modeling of Ultracompact Electrooptic Modulators" by Honardoost et al, Journal of Lightwave Technology, vol. 36, No. 24, pp. 5893-5902 (Year: 2018).*

"Conductor Loss of Capacitively Loaded Slow Wave Electrodes for High-Speed Photonic Devices" by Shin et al, Journal of Lightwave Technology, vol. 29, No. 1, pp. 48-52 (Year: 2011).*

"Nano-opto-electro-mechanical switches operated at CMOS-level voltages" by Haffner et al, Science, vol. 366, pp. 860-864 (Year: 2019).*

Boes et al., Improved second harmonic performance in periodically poled LNOI waveguides through engineering of lateral leakage, Opt. Express 27, 23919-23928 (2019) (Year: 2019).

Boes et al., Status and Potential of Lithium Niobate on Insulator (LNOI) for Photonic Integrated Circuits, Laser Photonics Rev. 2018, 1700256 (Year: 2018).

Burrows et al., "Slot-vee antenna-coupled electro-optic modulator," Proc. SPIE 3463, Photonics and Radio Frequency II, (Nov. 3, 1998); doi: 10.1117/12.330399 (Year: 1998).

Caspar et al., High-Aspect-Ratio LiNbO3 Ridge Waveguide With Vertical Buffer Layer and Enhanced Electro-Optical Efficiency, Journal of Lightwave Technology, vol. 36, No. 13, Jul. 1, 2018 (Year: 2018).

Costanzo et al., Benzocyclobutene as Substrate Material for Planar Millimeter-Wave Structures: Dielectric Characterization and Application, J Infrared Milli Terahz Waves (2010) 31 :66-77 (Year: 2010).

Costanzo et al., Millimeter-Waves Structures on Benzocyclobutene Dielectric Substrate, RADIOENGINEERING, vol. 20, No. 4, Dec. 2011 (Year: 2011).

Ding et al., High-Speed Silicon Modulator With Slow-Wave Electrodes and Fully Independent Differential Drive, Journal of Lightwave Technology, vol. 32, No. 12, Jun. 15, 2014 (Year: 2014).

Dogru et al., Traveling Wave Electrodes for Substrate Removed Electro-Optic Modulators With Buried Doped Semiconductor Electrodes, IEEE Journal of Quantum Electronics, vol. 49, No. 7, Jul. 2013 (Year: 2013).

Dris et al., A programmable, multi-format phoitonic transceiver platform enabling flexible networks, We. D5.2, ICTON 2015. (Year:2015).

Dummer et al., Periodic Loading and Selective Undercut Etching for High-Impedance Traveling-Wave Electroabsorption Modulators, OThC6.pdf, OFC/NFOEC 2008 (Year: 2008).

EOSPACE, 40+ GB/S Modulators, 2019.

He et al., High-Performance Hybrid Silicon and Lithium Niobate Mach-Zehnder Modulators for 100 Gbit/s and Beyond, Nature Photonics 2019, 13(5): 359-364, arXiv: 1807.10362v2 [physics. app-ph] 2018 (Year: 2018).

Hinakura et al., Electro-optic phase matching in a Si photonic crystal slow light modulator using meander-line electrodes, Optics Express, V. 28, N. 9, 2018 (Year: 2018).

(56) References Cited

OTHER PUBLICATIONS

Honardoost et al., Towards Subterahertz Bandwidth Ultracompact Lithium Niobate Electooptic Modulators, Optics Express, vol. 27, No. 5, Mar. 4, 2019, pp. 6495-6501.
Jeremy Witzens, High-Speed Silicon Photonics Modulators, Proceedings of the IEEE, vol. 106, No. 12, Dec. 2018 (Year: 2018).
Kharel et al., "Breaking voltage-bandwidth limits in integrated lithium niobate modulators using micro-structured electrodes," Optica 8, 357-363 (2021).
Lewen et al., Ultra high-speed segmented traveling-wave electroabsorption modulators, OSA/OFC 2003, PD38-1 (Year: 2003).
Li et al., Analysis of Segmented Traveling-Wave Optical Modulators, Journal of Lightwave Technology, vol. 22, No. 7, Jul. 2004, pp. 1789-1796.
Li et al., Silicon intensity Mach-Zehnder modulator for single lane 100 GB/s applications, Photonics Research, V. 6, N. 2, 2018 (Year: 2018).
Mercante et al., Thin film lithium niobate electro-optic modulator with terahertz operating bandwidth, Optics Express, V. 28, N. 11, 2018 (Year: 2018).
Patel et al., Design, analysis, and transmission system performance of a 41 GHz silicon photonic modulator, Optics Express, V. 23, N. 11, 2015. (Year: 2015).
Rao et al., "High-performance and linear thin-film lithium niobate Mach-Zehnder modulators on silicon up to 50 GHz," Opt. Lett. 41, 5700-5703 (2016) (Year: 2016).
Rao et al., Heterogeneous Microring and Mach-Zehnder Modulators Based on Lithium Niobate and Chalcogenide Glasses on Silicon, Opt. Express 23, 22746-22752 (2015) (Year: 2015).
Shin et al., Conductor Loss of Capacitively Loaded Slow Wave Electrodes for High-Speed Photonic Devices, Journal of Lightwave Technology, vol. 29, No. 1, Jan. 1, 2011 (Year: 2011).
Shin etal., Bulk Undoped GaAs—AIGaAs Substrate-Removed Electrooptic Modulators With 3.7-V-cm Drive Voltage at 1.55 micron, IEEE Photonics Technology Letters, vol. 18, No. 21, Nov. 1, 2006 (Year: 2006).
Shin etal., Ultralow Drive Voltage Substrate Removed GaAs/AIGaAs Electro-Optic Modulators at 1550 nm, IEEE Journal of Selected Topics in Quantum Electronics, vol. 19, No. 6, Nov./Dec. 2013 (Year: 2013).
Soltani et al., Efficient quantum microwave-to-optical conversion using electro-optic nanophotonic coupled resonators, Phys. Rev. A 96, 043808—Published Oct. 5, 2017 (Year: 2017).
Stenger et al., "Low Loss and Low Vpi Thin Film Lithium Niobate on Quartz Electro-optic Modulators," 2017 European Conference on Optical Communication (ECOC), Gothenburg, 2017, pp. 1-3, doi: 10.1109/ECOC.2017.8346144. (Year: 2017).
Thorlabs, Lithium Niobate Electro-Optic Modulators, Fiber-Coupled, Nov. 12, 2020, pp. 1-4.
Wang et al., "Nanophotonic lithium niobate electro-optic modulators," Opt. Express 26, 1547-1555, (2018); arXiv:1701.06470v1 [physics.optics] Jan. 23, 2017 (Year: 2017).
Wang et al., Design of Ultra-Thin Dielectric Waveguide Meander Line for 850 GHz Traveling Wave Tube, 2018 IEEE International Vacuum Electronics Conference (IVEC), Monterey, CA, 2018, pp. 395-396, doi: 10.1109/IVEC.2018.8391578 (Year: 2018).
Wang et al., Integrated Lithium Niobate Electro-optic Modulators Operating at CMOS-Compatible Voltages, Springer Nature Limited, Oct. 4, 2018, vol. 562, pp. 101-112.
Wang et al., Lithium Niobate Nonlinear Nanophotonics, Dissertation, SEAS, Harvard University, 2017 (Year: 2017).
Wang et al., Ultrahigh-efficiency wavelength conversion in nanophotonic periodically poled lithium niobate waveguides, Optica, V. 5, N. 11, 2018 (Year: 2018).
Xu et al., High-Performance Coherent Optical Modulators Based on Thin-Film Lithium Niobate Platform, Aug. 6, 2020, pp. 1-7.
Zhou et al., Silicon Photonics Carrier Depletion Modulators Capable of 85Gbaud 16QAM and 64Gbaud 64QAM, 2019.
Robert G. Walker, High-Speed III-V Semiconductor Intensity Modulators, IEEE Journal of Quantum Electronics, vol. 27, No. 3, Mar. 1991.
Annoymous "UV 210 Positive DUV Photoresist" Rohm and Haas Electronic Materials Microelectronic Technologies, Apr. 2004.
Wang et al., "Integrated High Quality Factor Lithium Niobate Microdisk Resonators" Optical Sciences of America, vol. 22 No. 25, Dec. 4, 2014.
Kim et al., "Effects of parasitic modes in high-speed LiNbO3 optical modulators," Opt. Express 12, 2568-2573 (2004) (Year: 2004).
Yang et al., Surface acoustic waves in acoustic superlattice lithium niobate coated with a waveguide layer. AIP Advances Apr. 1, 2017; 7 (4): 045206. https://doi.Org/10.1063/1.4980057, (Year: 2017).
Zhang et al., Sound transmission properties assisted by the phase resonances of composite acoustic gratings. J. Appl. Phys. Feb. 28, 2016; 119 (8): 084902. https://doi.Org/10.1063/1.4942444 (Year: 2016).
Akiyama et al., "High-speed and efficient silicon modulator based on forward-biased pin diodes", Frontiers in Physics, V. 2, DOI 10.3389/fphy.2014.00065m 2014 (Year: 2014).
Shao et al., Microwave-to-Optical Conversion using Lithium Niobate Thin-Film Acoustic Resonators, Optica 6, 1498-1505 (2019), available Jul. 11, 2019 at https://arxiv.org/pdf/1907.08593.pdf (Year: 2019).
Stepanenko et al., "Optimization of RF electrodes for electro-optic modulator based on quantum-confined Stark effect", 2019 J. Phys.: Conf. Ser. 1145 012028 (Year: 2019).
Tadesse et al., Sub-Optical Wavelength Acoustic Wave Modulation of Integrated Photonic Resonators at Microwave Frequencies. Nat Commun 5, 5402 (2014). https://doi.org/10.1038/ncomms6402 (Year: 2014).
Wang et al., "Measurement Method of Electro-Optic Coefficients using Photoelastic Modulation," Appl. Opt. 58, 4271-4276 (2019) (Year: 2019).
Yudistira et al., Surface Acoustic Wave Generation in ZX-cut LinbO3 Superlattices Using Coplanar Electrodes, Appl. Phys. Lett. 95, 052901, (2009) https://doi.org/10.1063/1.3190518 (Year: 2009).
Bacon et al., Acoustic waves generated by pulsed microwaves in viscoelastic rods: Modeling and experimental verification. J. Acoust. Soc. Am. Sep. 1, 2001; 110 (3): 1398-1407. https://doi.Org/10.1121/1.1391241 (Year: 2001).
Dong et al., Characterization of the Brillouin grating spectra in a polarization-maintaining fiber, Opt. Express 18, 18960-18967 (2010) (Year: 2010).
Aliev et al., Porous silicon bulk acoustic wave resonator with integrated transducer, Nanoscale Res Lett, Jul. 9, 2012, pp. 1-6.
Cai et al., Acousto-optical modulation of thin film lithium niobate waveguide devices, Photonics Research, vol. 7, No. 9, Sep. 2019, pp. 1003-1013 (2019).
Chang et al., Thin film wavelength converters for photonic integrated circuits, Optica vol. 3, No. 5, May 2016, pp. 531-535.
Fu et al., Advances in piezoelectric thin films for acoustic biosensors, acoustofluidics and lab-on-chip applications, Progress In Materials Science 89, 2017, pp. 31-91.
Ghadimi et al., Elastic strain engineering for ultralow mechanical dissipation, Science 360, May 18, 2018, pp. 764-768.
Safavi-Naeini et al. Two-Dimensional Phononic-Photonic Band Gap Optomechanical Crystal Cavity, Phys. Rev. Lett. 112, Apr. 18, 2014, pp. 153603-1-153603-5.
Safavi-Naeini et al., Design of optomechanical cavities and waveguides on a simultaneous bandgap phononic- photonic crystal slab, Opt. Express vol. 18, No. 14, Jul. 5, 2010, pp. 14926-14943.
Santos et al., Hybrid confinement of optical and mechanical modes in a bullseye optomechanical resonator, Opt. Express vol. 25, No. 2, Jan. 23, 2017, pp. 508-529.
Van Laer et al., Unifying Brillouin scattering and cavity optomechanics in silicon photonic wires, CLEO: 2015, OSA Technical Digest (online) (Optica Publishing Group, 2015), paper STh4I.4 (Year: 2015).
Van Laer et al., Unifying Brillouin scattering and cavity optomechanics, Physical Review A 93, 2016, pp. 053828-1-053828-15.
Weigel et al., Bonded thin film lithium niobate modulator on a silicon photonics platform exceeding 100 GHz 3-dB electrical

(56) References Cited

OTHER PUBLICATIONS modulation bandwidth, Optics Express, vol. 26, No. 18, Sep. 3, 2018 (Year: 2018), pp. 23728-23739.
Hu et al., Preparation and microwave dielectric properties of SiO2 ceramics by aqueous Sol-Gel technique, Journal of Alloys and Compounds, vol. 559, 2013, pp. 129-133.
Kuypers et al., Green's function analysis of Lamb wave resonators, IEEE Ultrasonics Symposium, 2008, pp. 1548-1551.
Rueda et al., Efficient microwave to optical photon conversion: an electro-optical realization, Optica, vol. 3, No. 6, Jun. 2016, pp. 597-604.
Wang et al., Design and Fabrication of S0 Lamb-Wave Thin-Film Lithium Niobate Micromechanical Resonators, Journal of Microelectromechanical Systems, vol. 24, No. 2, Apr. 2015, pp. 300-308.
Yang et al., Characteristics of coplanar waveguide on lithium niobate crystals as a microwave substrate, Journal of Applied Physics 101, 2007, 5 pages.
Alam et al., Microwave characterization of lithium niobate electrooptic modulators with traveling wave electrodes, International Conference on Computer and Communication Engineering, 2008, pp. 118-122.
Krasnokutska et al., Ultra-low Loss Photonic Circuits in Lithium Niobate on Insulator, Optics Express, vol. 26, No. 2, pp. 897-904 (2018).
Tu et al., 50-GB/s silicon optical modulator with traveling-wave electrodes, Opt. Express 21, 2013, p. 12776-12782.
Ali-Abadi et al., Design of Dual-band Impedance Matching Circuit Using T-shape Shunt Stub, Signal Processing and Renewable Energy (SPRE), Jun. 2019, pp. 1-8.
Burla et al., 500 GHz plasmonic Mach-Zehnder modulator enabling sub-THz microwave photonics, APL Photonics 4(5):056106, May 30, 2019, 12 pages.
Izutsu et al., Band Operation of Guided-Wave Light Modulators with Filter-Type Coplanar Electrodes, IEICE Trans. Electron., vol. E78-C, No. 1, Jan. 1995, pp. 55-60.
Koeber et al., Femtojoule electro-optic modulation using a silicon-organic hybrid device, Light: Science & Applications 4(2), 2015, 8 pages.
Luo et al., Nonlinear integrated quantum electro-optic circuits, Science Advances, Research Article, 5: eaat1451, Jan. 2, 2019, 7 pages.
Ramaswami et al., Chapter 3—Components, Optical Networks, 3rd Edition, Morgan Kaufmann, ISBN 9780123740922, 2010, pp. 113-243.
Shin et al., Novel T-rail electrodes for substrate removed low-voltage high-speed GaAs/AlGaAs electrooptic modulators, IEEE Transactions on Microwave Theory and Techiques, vol. 53, No. 2, Feb. 2005, pp. 636-643.
Shu et al., Significantly High Modulation Efficiency of Compact Graphene Modulator Based on Silicon Waveguide, Scientific Reports, 8:991, Jan. 17, 2018, 8 pages.
Siew et al., Ultra-Low Loss Ridge Waveguides on Lithium Niobate via Argon Ion Milling and Gas Clustered Ion Beam Smoothening, Optics Express 4421, vol. 26, No. 4, Feb. 19, 2018, 10 pages.
Abe et al., Analysis of ax-cut Ti:LiNbO3 Electrooptic Modulator with a Ridge Structure, SBMO/IEEE MTT-S International Microwave and Optoelectronics Conference, vol. 1, 1999, pp. 144-148.

* cited by examiner

HIGH PERFORMANCE OPTICAL MODULATORS AND DRIVERS

CROSS REFERENCE TO OTHER APPLICATIONS

This application claims priority to U.S. Provisional Patent Application No. 63/033,666 entitled HIGH PERFORMANCE OPTICAL MODULATOR filed Jun. 2, 2020 which is incorporated herein by reference for all purposes.

BACKGROUND OF THE INVENTION

An optical modulator typically includes one or more waveguides formed using materials having an index of refraction that is sensitive to electric fields. The waveguide(s) carry an optical signal. The modulator also includes electrodes that apply an electric field to the waveguide to alter the index of refraction of the waveguide. As a result, the phase, intensity and/or polarization of the optical signal traversing the waveguide can be modulated.

Optical modulators and other electro-optic devices are also desired to meet certain performance benchmarks. For example, an optical modulator is desired to be capable of providing a sufficient optical modulation at lower electrode driving voltages while consuming a small total area. The optical modulator is also desired to have low electrode (e.g. microwave) signal losses for the electrical signal through the electrodes and low optical losses for the optical signal traversing the waveguide. Further, the optical modulators are desired to be capable of providing the low loss transmission and large modulation at low voltages over a wide bandwidth of frequencies. Therefore, an electro-optic device that may have low electrode losses, low optical losses, consume a controlled amount of area, and/or provide the desired optical modulation at low driver voltages is desired.

BRIEF DESCRIPTION OF THE DRAWINGS

Various embodiments of the invention are disclosed in the following detailed description and the accompanying drawings.

DETAILED DESCRIPTION

Figure 1A:
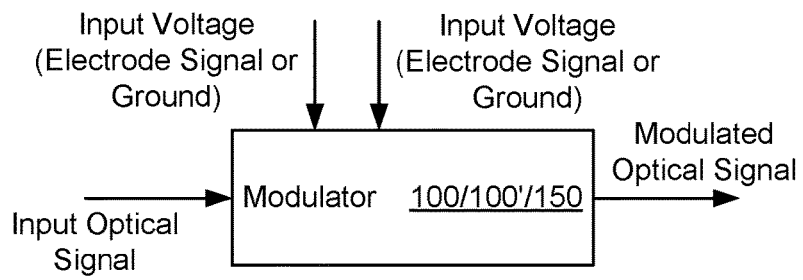
FIGS. 1A-1F depict embodiments of optical devices having electrodes to which a signal is input.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An electro-optic device (also termed an optic device), such as an electro-optical modulator (also termed an optical modulator) typically includes one or more waveguides that carry optical signal(s) and electrodes that carry electrical signals. The waveguide(s) are formed using material(s) having an index of refraction that is sensitive to electric fields. The electrodes apply an electric field to the waveguide to alter the index of refraction of the waveguide. To apply this electric field, a signal is input to the electrodes. This signal is a time-varying electrical signal, typically having frequencies in the microwave range. More specifically, a driver receives a data signal and provides a corresponding electrical signal to the electrodes. Typically, the driver is external to the optical modulator. For example, the driver is typically off-chip, while the waveguide(s) and electrodes are on-chip. In regions in which the electrodes are in proximity to the waveguide, an electric field due to the signal traveling through the electrodes modulates the index of refraction of the waveguide. As a result, the phase, intensity and/or polarization of the optical signal traversing the waveguide can be modulated.

Although electro-optic devices function, their performance may be limited by a number of factors. For example, the electrodes are desired to be in proximity to the waveguide to increase the strength of the electric field at the waveguide. The higher electric field enhances the change in the waveguide's index of refraction and increases modulation of the optical signal. However, electrodes may suffer from electrode (e.g. microwave) signal losses as the microwave signal traverses the electrode. Such losses may be increased by proximity to the waveguide. These losses may adversely affect the ability of the electrode to provide the desired electric field at the waveguide. Absorption of the microwave signal by surrounding structures as well as resistive losses in the electrode exacerbate these losses. Furthermore, the requisite driving voltage for the electrodes increases with increasing frequency of the modulation. For example, an optical signal may be readily modulated at a frequency of 1 GHz using an electrode voltage of less than two volts. However, for higher frequencies, for example in the 100 GHz range or higher, the requisite electrode voltage may be significantly higher (e.g. five volts or more). A larger voltage is applied to the electrodes in order to obtain the desired change in index of refraction. Thus, optical modulators may require larger input voltages to the electrodes and consume more power than is desirable. Drivers may require a higher voltage than is desirable. Consequently, electro-optic devices having improved performance are still desired.

Many technologies have been proposed to improve optical modulators. These technologies include waveguides utilizing semiconductors (e.g. silicon and/or indium phosphide), bulk lithium niobate (LN), barium titanate (BTO), and/or plasmonics. However, these and other technologies suffer significant drawbacks in one or more of the characteristics mentioned above. A single limiting factor in performance of an optical modulator may also prevent the optical modulator from functioning as desired. For example, unacceptable electrode (microwave) losses may render the modulator unusable for particular applications even if the electrodes can be driven at low voltages. Moreover, the optical modulator and connections thereto are desired to facilitate operation of the optical device. For example, the connection between the driver and the electrodes and/or the connection between the source of an optical signal and the waveguide are desired to be configured to reduce losses and improve operation of the optical device. Consequently, mechanisms for providing, connecting to and utilizing an optical device having low optical signal losses, low electrode signal losses, consuming a controlled amount of area, and/or providing the desired optical modulation at lower voltages are still desired.

An interface to a ferroelectric nonlinear (e.g. second order) optical device, such as a lithium niobate (LN) optical modulator or a lithium tantalate (LT) optical modulator, is described. The interface includes a first differential line pair and a second differential line pair. The first differential line pair has a first differential line pair negative line and a first differential line pair positive line arranged on opposing sides of a first waveguide. The first differential line pair negative line is arranged on a distal side of the first waveguide relative to a second waveguide. The first differential line pair positive line is arranged on a proximal side of the first waveguide relative to the second waveguide. The second differential line pair has a second differential line pair negative line and a second differential line pair positive line arranged on opposing sides of the second waveguide. The second differential line pair negative line is arranged on a distal side of the second waveguide relative to the first waveguide. The second differential line pair positive line is arranged on a proximal side of the second waveguide relative to the first waveguide. In some embodiments, the first and/or second waveguides include lithium tantalate and/or lithium niobate. In some embodiments, the first and/or second waveguides consist of lithium tantalate and/or lithium niobate. In some embodiments, the first differential line pair positive line and the second differential line pair positive line are a common line. In some embodiment, the interface is part of a driver providing electrode signal(s) to electrode(s) of the optical modulator. In some embodiments, the interface is part of the optical modulator and receives electrode signal(s) from the driver.

Using the interface, a lower voltage, lower power signal may be driven through the electrodes of the optical modulator and used to provide the desired modulation in the first and/or second waveguide. For example, the interface may be used in conjunction with the optical modulator and a differential driver having a positive output and a negative output. In some embodiments, the differential driver has a voltage amplitude of not more than two volts yet may be capable of providing a phase shift of 7C in the waveguide(s). In some embodiments, the voltage amplitude may be less (e.g. not more than one volt) for the same phase shift. Thus, performance of the optical modulator, or other ferroelectric nonlinear optical device, may be improved.

In some embodiments, the interface also includes a ground between the first differential line pair positive line and the second differential line pair positive line. In some such embodiments, the interface also includes a first ground pair. The first ground pair has a first ground and a second ground. The first differential line pair and the second differential line pair are between the first ground and the second ground. The first ground pair and the ground may be electrically connected.

The interface may also include a first line coupled to the first differential line pair negative line and to the second differential line pair negative line. The first line is connectable to an output of a differential driver. Thus, the output of the differential driver may be split between the first differential line pair negative line and the second differential line pair negative line.

In some embodiments, a ferroelectric nonlinear optical modulator, such as an LN optical modulator or an LT optical modulator, is described. The optical modulator (e.g. the ferroelectric nonlinear optical modulator) includes first and second waveguides as well as first and second differential electrode pairs. The first and second waveguides may include at least one of LT and LN. In some embodiments, the first and/or second waveguides consist of LN and/or LT. The first differential electrode pair has a first pair negative electrode and a first pair positive electrode arranged on opposing sides of the first waveguide. The first pair negative electrode is arranged on a distal side of the first waveguide relative to the second waveguide. The first pair positive electrode is arranged on a proximal side of the first waveguide relative to the second waveguide. The second differential electrode pair has a second pair negative electrode and a second pair positive electrode arranged on opposing sides of the second waveguide. The second pair negative electrode is arranged on a distal side of the second waveguide relative to the first waveguide. The second pair positive electrode is arranged on a proximal side of the second waveguide relative to the first waveguide. In some embodiments, the first pair positive electrode and the second pair positive electrode are a common electrode.

The optical modulator may also include a ground between the first pair positive electrode and the second pair positive electrode. In some embodiments, the ground includes a first section, a bending section, and a second section. The bending section is between the first section and the second section. The first section and the second section are separated by a distance of at least one micrometer. In some such embodiments, the distance is at least ten micrometers. The optical modulator may also have a first ground pair including first and second grounds. The first differential electrode pair and the second differential electrode pair are between the first ground and the second ground. The first ground pair and the ground may be electrically connected.

In some embodiments, the optical modulator includes a converter coupled to an interface for a two-line differential driver. The converter includes a first line coupled to the first pair negative electrode and to the second pair negative electrode.

The optical modulator may be coupled to a differential driver having a positive output and a negative output. The differential driver may have a voltage amplitude of not more than two volts for a phase shift in the first and/or second waveguides of π. Thus, the phase shift may be π for one of the first and second waveguides or a relative phase shift of π between the first and second waveguides. In some embodiments, the voltage amplitude is not more than one volt for a phase shift of π. In some embodiments, the differential driver is a CMOS driver.

In some embodiments, the optical modulator also includes an interface. The first differential electrode pair and the second differential electrode pair are connectable to a differential driver having a plurality of outputs. The first differential electrode pair and the second differential electrode pair having impedances matching corresponding impedances of the plurality of outputs to within twenty percent.

A method for modulating an optical signal is described. The method includes receiving an optical signal at an optical input of an optical modulator, such as an LN or LT optical modulator. The optical input directs the optical signal to a first waveguide and to a second waveguide. The first and second waveguides may include at least one of LT and LN. In some embodiments, the first and/or second waveguides consist of LN and/or LT. A differential signal is received from a differential driver at an interface of the optical modulator. The differential signal includes a positive signal and a negative signal. The differential signal is transmitted to a first differential electrode pair and a second differential electrode pair. The first differential electrode pair has a first pair negative electrode and a first pair positive electrode arranged on opposing sides of the first waveguide. The first pair negative electrode is arranged on a distal side of the first waveguide relative to the second waveguide. The first pair positive electrode is arranged on a proximal side of the first waveguide relative to the second waveguide. The second differential electrode pair has a second pair negative electrode and a second pair positive electrode arranged on opposing sides of the second waveguide. The second pair negative electrode is arranged on a distal side of the second waveguide relative to the first waveguide. The second pair positive electrode is arranged on a proximal side of the second waveguide relative to the first waveguide. Transmitting the signal also includes providing the positive signal to the first pair positive electrode and to the second pair positive electrode and providing the negative signal to the first pair negative electrode and to the second pair negative electrode.

Although primarily described in the context of lithium niobate, other nonlinear optical materials may be used in the optical devices described herein. Lithium tantalate (e.g. $LiTaO_3$) has similar optical properties to LN, as well as similar challenges. For example, lithium tantalate (LT) may also be challenging to fabricate and susceptible to damage during high temperature fabrication methods. Other ferroelectric nonlinear (e.g. second order) optical materials may also be desired to be used in optical devices. Such ferroelectric nonlinear optical materials may include but are not limited to potassium niobate (e.g. $KNbO_3$), gallium arsenide (GaAs), potassium titanyl phosphate (KTP), lead zirconate titanate (PZT), and barium titanate ($BaTiO_3$). The techniques described may also be used for other nonlinear ferroelectric optical materials, particularly those which may otherwise be challenging to fabricate. For example, such nonlinear ferroelectric optical materials may have inert chemical etching reactions using conventional etching chemicals such as fluorine, chlorine or bromine compounds.

The techniques are also described in the context of positive and negative electrodes, positive and negative voltages, and positive and negative lines. However, such electrodes, voltages, and lines carry or are signals that are opposite in polarity with respect to a reference. Stated differently, positive and negative refer to polarity with respect to a reference. In some embodiments, the reference is ground. In such embodiments, a positive line has the opposite polarity with respect to ground as a negative line. For example, the positive line might be at +2 volts at a particular location and the negative line might be at −2 Volts at a corresponding location at the same time. In some embodiments, the reference is a nonzero voltage. In such embodiments, the positive voltage line has the opposite polarity with respect to the nonzero voltage as the negative voltage. In the example above but for a nonzero bias, B, the positive line may be at B+2 volts at the particular time, while the negative line may be at B−2 volts. Further, positive and negative signals generally vary around the reference. For example, the positive voltage may, at various times, be −1, 0, 1, 0, −1, 1. At the same times, the negative signal is 1, 0, −1, 0, 1, −1. Thus, the terms "positive" and "negative" simply indicate that the signals are opposite in polarity with respect to the reference. There is no requirement that the "positive" signal remain positive with respect to the reference or that the "negative" signal remains negative with respect to the reference.

In some embodiments, for example, at a particular point in the positive electrode, the potential may be +v at a particular time. At the same time, a corresponding point directly across from the particular point (i.e. on the other side of the waveguide), the negative electrode has a potential of −v. In such an embodiment the reference voltage is zero. However, in some embodiments, the reference may be another, nonzero, bias.

Figure 1B:
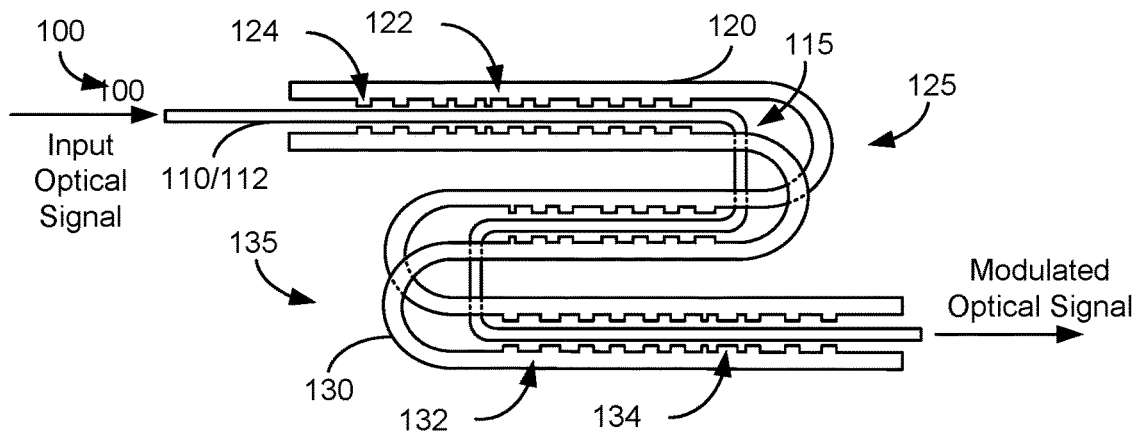
Figure 1C:
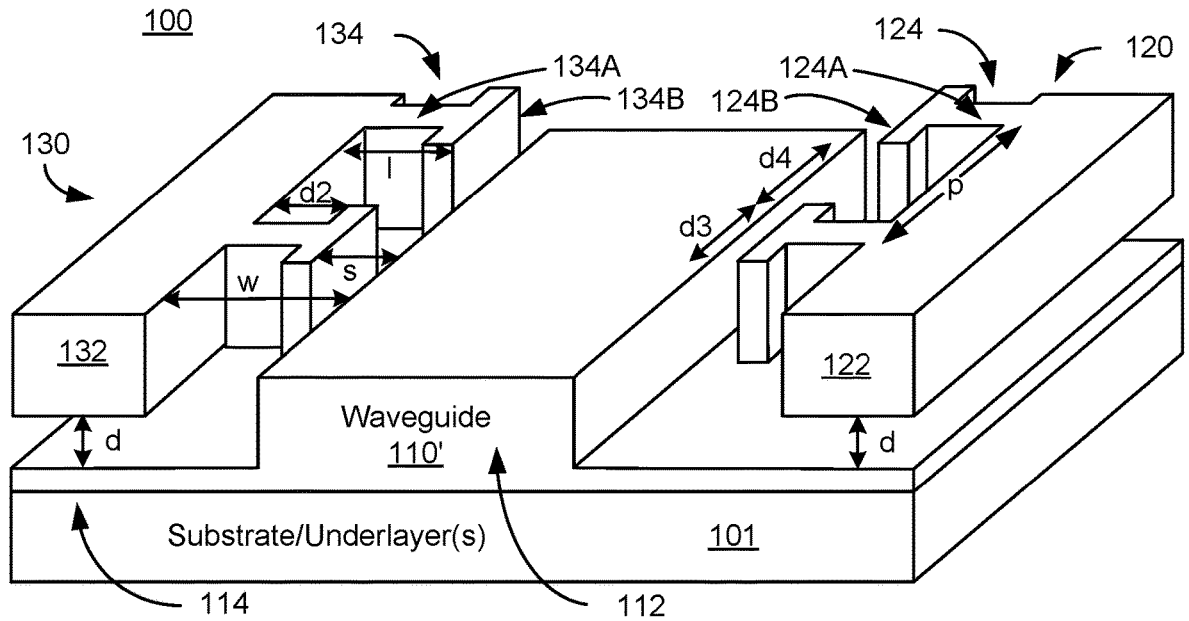
Figure 1D:
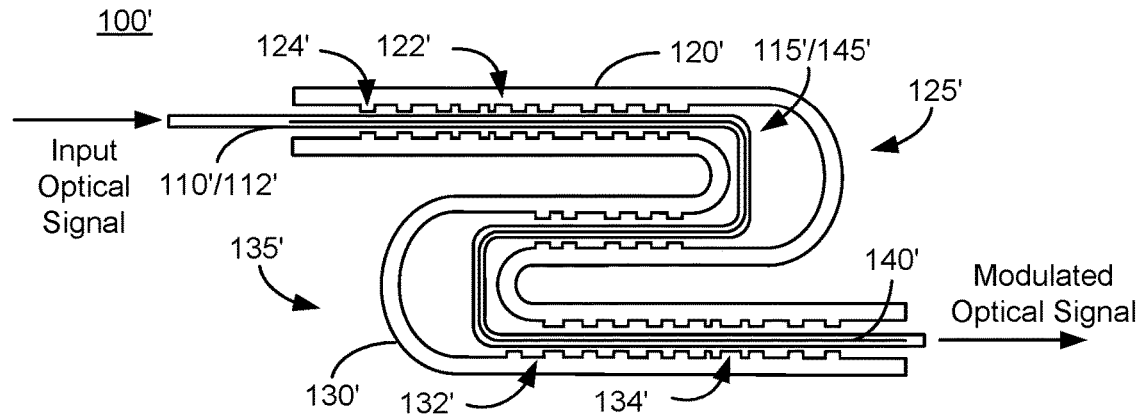
Figure 1E:
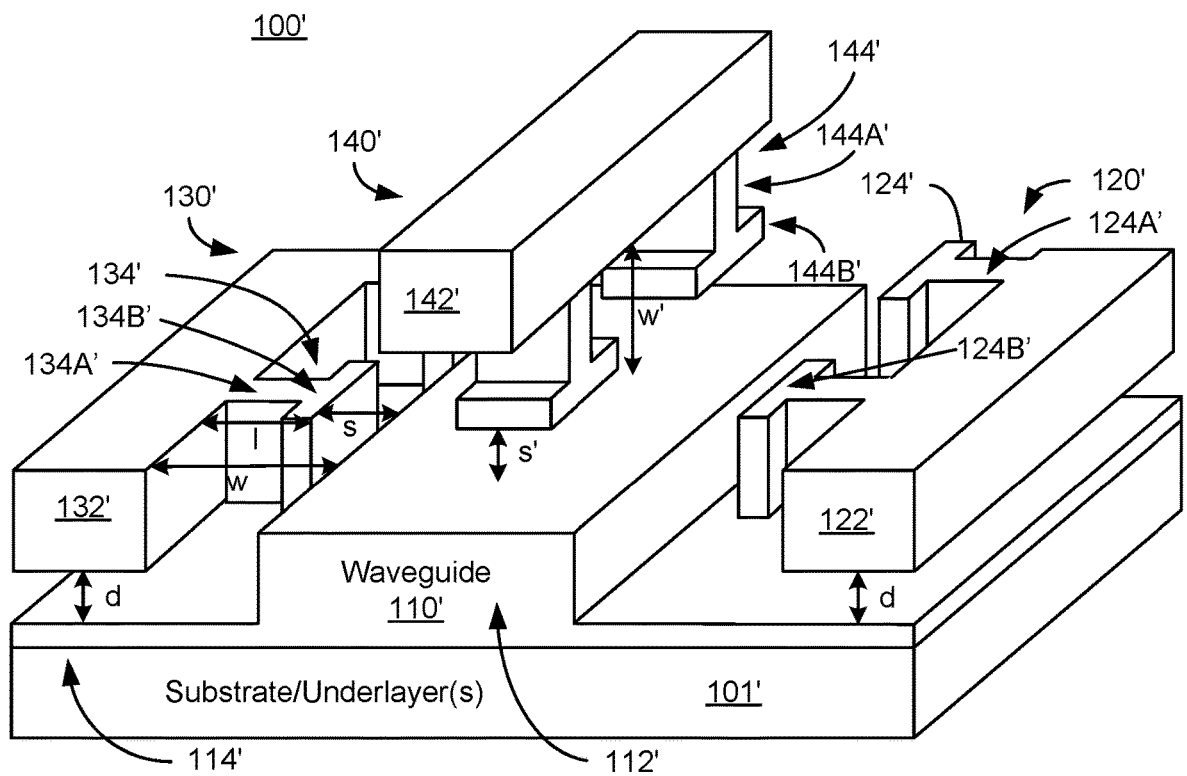
Figure 1F:
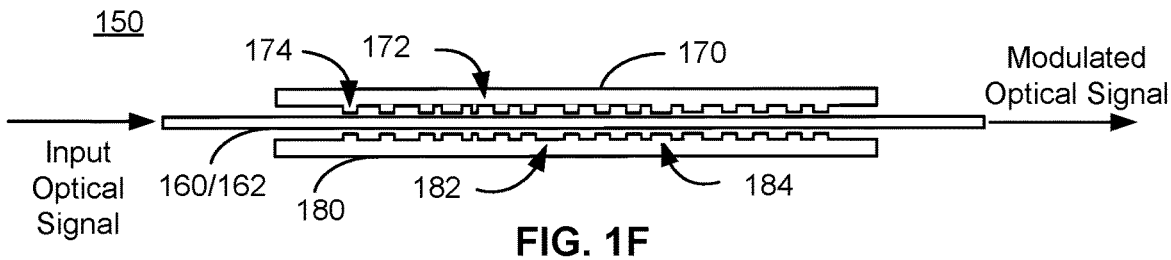

FIGS. 1A-1F depict embodiments of optical devices 100, 100' and 150 into which an optical signal desired to be modulated is input. FIG. 1A is a block diagram of optical modulator 100, 100' and/or 150. FIG. 1B is a plan view of an embodiment of optical modulator 100. FIG. 1C is a perspective view of a portion of optical modulator 100. Optical modulator 100 may be an optical modulator with an electro-optic response (e.g. in picometers per volt) in the thin film plane (e.g. x-cut or y-cut lithium niobate). FIGS. 1D-1E depict plan and perspective views of optical modulator 100', which is analogous to optical modulator 100. However, optical modulator 100' may be an optical modulator with an electro-optic response (e.g. in picometers per volt) out of plane of the thin film plane (e.g. z-cut lithium niobate). FIG. 1F depicts a plan view of optical modulator 150, which is a straight optical modulator (e.g. excludes waveguide and electrode bending sections described herein). Optical modulator 150 may have an electro-optic response in the thin film plane (e.g. x-cut or y-cut lithium niobate) or perpendicular to the thin film plane (e.g. z-cut lithium niobate). As used herein, an x-cut or y-cut modulator is one which has an electro-optic effect in the thin film plane (e.g. even if materials such as lithium niobate are not used). Similarly, as used herein, a z-cut optical modulator has an electro-optic effect out of (e.g. perpendicular to) the thin film plane (e.g. even if materials such as lithium niobate are not used). FIGS. 1B-1F are not to scale. Further, FIGS. 1A-1F depict only portions of optical modulators 100, 100' and 150. Other configurations are possible. For example, optical devices having a different number of waveguides, other and/or additional waveguide components such as splitters and branches (which split a waveguide into multiple waveguides), and/or a different number of electrodes are possible. Referring to FIG. 1A, an optical signal is input to optical modulator 100. For example, the optical signal may be provided by one or more lasers. An electrode signal having a voltage is also input to modulator 100. The electrode signal may be from a driver (not shown) that is on-chip or off-chip. In some embodiments, the frequency of the electrode signal is in the microwave range. Consequently, the terms microwave signal and electrode signal are used synonymously herein. Optical modulator 100 utilizes the electrode signal to modulate the optical signal and outputs a modulated optical signal.

Referring to FIGS. 1B-1C, optical modulator 100 includes waveguide 110 and electrodes 120 and 130. Also shown is substrate/underlying layers 101. In some embodiments, substrate 101 includes a silicon wafer and a silicon dioxide layer between the silicon wafer and waveguide 110. Other substrates may be used in other embodiments. In some embodiments, substrate 101 is a dielectric having a low microwave dielectric constant, for example a microwave dielectric constant of less than eleven. In some embodiments, the substrate has a microwave dielectric constant of less than eight. In some such embodiments, the substrate has a microwave dielectric constant of less than five. For example, substrate 101 may include sapphire, quartz and/or fused silica. In some embodiments, substrate 101 is a dielectric material having refractive index lower than the waveguide. Other and/or additional underlayer(s) may be used in other embodiments. Further, other geometric configurations of substrate and/or underlayers may be used in some embodiments. In some embodiments, underlayer(s) with a low microwave dielectric constant such as silicon dioxide, may be used on top of the low microwave dielectric constant substrate 101. Other and/or additional underlayer(s) may be used in other embodiments. Further, low microwave dielectric constant underlayer(s) may be used in conjunction with other substrates with larger microwave dielectric constant. For example, a low microwave dielectric constant underlayer layer of silicon dioxide may be provided on a substrate 101 that has a microwave dielectric constant greater than eleven, such as silicon or LN. In some embodiments, the underlayer provided is desired to be thick. For example, the underlayer may be at least three micrometers thick and not more than one hundred micrometers thick. Further, other geometric configurations of substrate and/or underlayers may be used in some embodiments.

Waveguide 110 is used to transmit an optical signal. More specifically, waveguide 110 receives an input optical signal and outputs a modulated optical signal. Electrodes 120 and 130 apply a time varying electric field to waveguide 110, which alters the index of refraction of waveguide 110. To apply the electric field electrode(s) 120 and/or 130 carry an electrode signal. In some embodiments, electrode 120 carries an electrode signal, such as a microwave signal, while electrode 130 is a ground. In some embodiments, electrode 130 carries an electrode (e.g. microwave) signal, while electrode 120 is ground. In some embodiments, both electrodes 120 and 130 carry electrode signals. Although electrodes 120 and 130 are depicted as crossing each other and crossing waveguide 110, other configurations are possible. For example, in devices where a strong electro-optic response presents in the out-of-plane direction to that of the thin-film layer (e.g. z-cut and those described below), neither electrodes nor waveguides cross each other in some embodiments. Thus, electrodes 120 and 130 combine with waveguide 110 to provide a modulated optical signal. Electrodes 120 and 130 are drawn around waveguide 110 to indicate that waveguide 110 experiences an applied electric field between 120 and 130, but does not indicate the physical locations of electrode 120 and 130. For example, it is possible to have electrode 120 directly on top or below the waveguide while 130 is on one side.

Waveguide 110 includes a ridge 112 and a thin film portion 114. For simplicity, waveguide 110 is depicted as a having a rectangular footprint and extending only between electrodes 120 and 130 in FIG. 1B. In the embodiment shown in FIGS. 1A-1C, thin film portion 114 and ridge portion are formed from the same material (e.g. from the same thin film). In other embodiments, the thin film portion 114 and ridge portion 112 may be formed from different materials. In such embodiments, the optical mode for the optical signal is substantially confined to ridge 112. For example, the optical mode for the optical signal carried by waveguide 110 may not extend to channel regions 122 and 132 of electrodes 120 and 130, respectively. Waveguide 110 includes at least one optical material possessing an electro-optic effect and may have a total optical loss of not more than 10 dB through modulator 110 (e.g. when biased at maximum transmission and as a maximum loss). In some embodiments, the optical material(s) are nonlinear. The total optical loss is the optical loss in a waveguide through a single continuous electrode region (e.g. as opposed to multiple devices cascaded together), such as is shown in FIGS. 1A-1E. In some embodiments, waveguide 110 has a total optical loss of not more than 8 dB through modulator 110. In some embodiments, the total optical loss is not more than 4 dB. In some embodiments, waveguide 110 has an optical loss of not more than 3 dB/cm (e.g. on average). In some embodiments, the nonlinear material in waveguide 110 has an optical loss of not more than 2.0 dB/cm. In some such embodiments, waveguide 110 has an optical loss of not more than 1.0 dB/cm. In some embodiments, waveguide 110 has an optical loss of not more than 0.5 dB/cm. As used herein, a nonlinear optical material exhibits the electro-optic effect and has an effect that is at least (e.g. greater than or equal to) 5 picometer/volt. In some embodiments, the nonlinear optical material has an effect that is at least 10 picometer/volt. In some such embodiments nonlinear optical material has an effect of at least 20 picometer/volt. The nonlinear optical material experiences a change in index of refraction in response to an applied electric field. In some embodiments, the nonlinear optical material is ferroelectric. In some embodiments, the electro-optic material effect includes a change in index of refraction in an applied electric field due to the Pockels effect. Thus, in some embodiments, optical materials possessing the electro-optic effect in one or more the ranges described herein are considered nonlinear optical materials regardless of whether the effect is linearly or nonlinearly dependent on the applied electric field. The nonlinear optical material may be a non-centrosymmetric material. Therefore, the nonlinear optical material may be piezoelectric.

In some embodiments, the nonlinear optical material in waveguide 110 includes lithium niobate (LN) and/or lithium tantalate (LT). In some embodiments, the nonlinear optical material for waveguide 110 consists of LN. In some embodiments, the nonlinear optical material for waveguide 110 consists of LT. Such nonlinear optical materials may have inert chemical etching reactions for conventional etching using chemicals such as fluorine, chlorine or bromine compounds. In some embodiments, the nonlinear optical material(s) include one or more of LN, LT, potassium niobate, gallium arsenide, potassium titanyl phosphate, lead zirconate titanate, and barium titanate. In other embodiments, other nonlinear optical materials having analogous optical characteristics may be used.

Waveguide 110 may have a different configuration in some embodiments. For example, waveguide 110 may omit thin film portion 114 or reduce the size of thin film portion 114. Ridge 112 may have another configuration. For example, ridge 112 may be trapezoidal, semicircular, stacked rectangular and/or have another geometry that guides the optical signal in a manner analogous to that which is described herein. Other and/or additional materials may be used. In some embodiments, different portions of waveguide 110 are formed from different materials. For example, thin film portion 114 and ridge 112 may be formed of different materials. Thin film 114 may include a nonlinear optical material such as LN and/or LT, while ridge 112 may be formed of a passive material such as silicon and/or silicon nitride. In some embodiments, ridge 112 may be located below thin film portion 114 (e.g. ridge 112 may be between thin film portion 114 and an underlying substrate 101). Similarly, various other optical components may be incorporated into waveguide 110 to provide the desired phase modulation, polarization modulation, intensity modulation, IQ modulation, other modulation and/or other functionality. For example, waveguide 110 may have wider portion(s) (not shown in FIGS. 1B-1C) for accommodating multiple modes. In some embodiments (not shown in FIGS. 1B-1C), waveguide 110 may include splitters to divide the optical signal into multiple branches for modulation and recombine the modulated optical signals for output. Thus, waveguide 110, as well as electrodes 120 and 130, may be configured to provide the desired functionality.

In some embodiments, the nonlinear optical material for waveguide 110 is formed as a thin film. For example, the thin film may have a thickness (e.g. of thin film portion 114 and ridge portion 112) of not more than three multiplied by the optical wavelengths for the optical signal carried in waveguide 110 before processing. In some embodiments, the thin film has a thickness (e.g. of thin film portion 114 and ridge portion 112) of not more than two multiplied by the optical wavelengths. In some embodiments, the nonlinear optical material has a thickness of not more than one multiplied by the optical wavelength. In some embodiments, the nonlinear optical material has a thickness of not more than 0.5 multiplied by the optical wavelengths. For example, the thin film may have a total thickness of not more than three micrometers as-deposited. In some embodiment, the thin film has a total thickness of not more than two micrometers. The thin film nonlinear optical material may be fabricated into waveguide 110 utilizing photolithography. For example, ultraviolet (UV) and/or deep ultraviolet (DUV) photolithography may be used to pattern masks for the nonlinear optical material. For DUV photolithography, the wavelength of light used is typically less than two hundred and fifty nanometers. To fabricate the waveguide, the thin film nonlinear optical material may undergo a physical etch, for example using dry etching, reactive ion etching (ME), inductively coupled plasma RIE. In some embodiments, a chemical etch and/or electron beam etch may be used. Waveguide 110 may thus have improved surface roughness. For example, the sidewall(s) of ridge 112 may have reduced surface roughness. For example, the short range root mean square surface roughness of a sidewall of the ridge 112 is less than ten nanometers. In some embodiments, this root mean square surface roughness is not more than five nanometers. In some cases, the short range root mean square surface roughness does not exceed two nanometers. Thus, waveguide 110 may have the optical losses in the range described above. In some embodiments, the height of ridge 112 is selected to provide a confinement of the optical mode such that there is a 10 dB reduction in intensity from the intensity at the center of ridge 112 at ten micrometers from the center of ridge 112. For example, the height of ridge 112 is on the order of a few hundred nanometers in some cases. However, other heights are possible in other embodiments.

A portion of waveguide 110 is proximate to electrodes 120 and 130 along the direction of transmission of the optical signal (e.g. from the input of the optical signal through waveguide 110 to the modulated optical signal output). The portion of waveguide 110 proximate to electrodes 120 and 130 may have a length greater than two centimeters. In some embodiments, the length of the portion of waveguide 110 proximate to electrodes 120 and 130 is at least 2.5 cm. In some embodiments, the length of this portion of waveguide 110 is at least three centimeters. Such lengths are possible at least in part because of the low optical losses per unit length for waveguide 110 described above. For example, waveguide 110 may have a total optical loss of not more than 10 dB through modulator 100. In some embodiments, the total optical loss is not more than 8 dB. Waveguide 110 may have a total optical loss of not more than 4 dB. In some embodiments, waveguide 110 has a total optical loss of not more than 3 dB. In some embodiments, the total optical loss is less than 2 dB. Because waveguide 110 can be made longer, the total optical modulation may be provided through the electric field generated by electrodes 120 and 130 may be larger. Further, because of the low optical losses and low microwave losses (described below), the desired optical modulation (e.g. change in index of refraction) may be achieved with a signal input to the electrode(s) 120 and/or 130 having a lower voltage. For example, $V\pi$ is the half wave voltage, or the amplitude of the input electrode signal required to shift the phase of the optical signal by $\pi$. In some embodiments, $V\pi$ is not more than six volts for signals in the 50-100 GHz range. In some embodiments, $V\pi$ is not more than three volts for signals in the 50-100 GHz range. In some embodiments, $V\pi$ is not more than two volts for signals in the 50-100 GHz range. In some embodiments, $V\pi$ is on the order of voltages provided via CMOS circuitry, for example in the range of 0.5 volts through 1.5 volts for signals in the 50-100 GHz range. For example, $V\pi$ may be not more than 1.5 volts at ten GHz. Thus, $V\pi$ is not more than 1.5 volts in some embodiments. In some such embodiments, $V\pi$ is not more than 1 volt for signals in the 50-100 GHz range. Other voltages for other frequency ranges are possible. Thus, performance of optical modulator 110 may be improved.

Further, the portion of aveguide 110 proximate to electrodes 120 and 130 has an optical mode cross-sectional area that is small. In some embodiments, the optical mode cross-sectional area is less than 3 multiplied by the square of the wavelength of the optical signal in the nonlinear optical material(s) (e.g. $\lambda^2$). In some embodiments, the optical mode cross-sectional area is less than 2 multiplied by the square of the wavelength of the optical signal in the nonlinear optical material(s). In some embodiments, the optical mode cross-sectional area is less than 1.5 multiplied by the square of the wavelength of the optical signal in the nonlinear optical material(s). In some embodiments, the optical mode cross-sectional area is less than 4 $\mu m^2$. In some such embodiments, the optical mode cross-sectional area is not more than 3 $\mu m^2$. In some embodiments, such a small optical mode cross-sectional area may be provided using thin films and fabrication technologies described herein. The optical mode cross-sectional area may also allow for the low optical losses described herein.

Waveguide 110 also includes waveguide bending sections 115. Although multiple waveguide bending sections are shown in FIG. 1B, only one waveguide bending section 115 is labeled. Each waveguide bending section 115 may have a bending radius of not more than 1 mm. In some embodiments, each waveguide bending section 115 has a bending radius of not more than 500 µm. In some embodiments, the minimum bending radius of each waveguide bending section 115 is at least 100 µm (e.g. the bending radius may be 125 µm in some embodiments). In some embodiments, each waveguide bending section 115 has a bending section optical loss of not more than 0.5 dB. The waveguide (and electrode) bending sections may be utilized to provide a longer region in which electrodes 120 and 130 are proximate to waveguide 110 while controlling the size of the device incorporating optical modulator 100. For example, waveguide 110 and electrodes 120 and 130 may occupy an area of not more than fifty square millimeters. Waveguide 110 and electrodes 120 and 130 occupy an area of not more than twenty square millimeters in some embodiments. In some embodiments, waveguide 110 and electrodes 120 and 130 reside on an integrated circuit having a length of not more than 32 millimeters. In some such embodiments, waveguide 110 and electrodes 120 and 130 reside on an integrated circuit having a length of not more than 22 millimeters. This is true despite the higher length of waveguide 110. Thus, a larger optical signal modulation may be achieved in a smaller overall device. Further, for shorter waveguides (e.g. waveguides having a length of 1 cm or less), bending sections may provide a more compact package even if the modulation achieved is not as great as for longer waveguides. Such an optical device consumes less area. Thus, an optical device 100 or 100' having shorter waveguides may still be improved through the use of bending sections.

Electrodes 120 and 130 apply electric fields to waveguide 110. Electrode 120 includes a channel region 122 and extensions 124 (of which only one is labeled in FIGS. 1B-1C). Electrode 120 and/or 130 may be fabricated using deposition techniques, such as electroplating, and photolithography to shape the electrode120 and/or 130. The resulting electrode 120 and/or 130 may have a lower frequency dependent electrode loss. In some embodiments, the frequency dependent electrode power loss for a particular frequency window (e.g. at least 10 GHz) in a frequency range between DC and five hundred GHz can be as low as 0.8 dB per square root of the electrode signal frequency per centimeter, where the electrode signal frequency is measured in GHz. In some embodiments, the frequency dependent electrode power loss for the same frequency window and frequency range can be as low as 0.75 dB per square root of the electrode signal frequency per centimeter for the particular frequency window (e.g. 10 GHz or more). In some embodiments, the electrode has an absorption electrode loss. In some embodiments, the absorption electrode loss for a particular frequency window (e.g. 10 GHz or more) in a frequency range between DC and five hundred GHz is less than 0.02 dB per GHz per centimeter. In some embodiments, the absorption electrode loss for the same frequency window and frequency range is less than 0.005 dB per GHz per centimeter for the frequency window in the frequency range of DC and five hundred GHz. In some embodiments, optical modulator 110 may include an additional electrode, such as a DC electrode (not shown in FIGS. 1A-1C). Such an additional electrode may be used to optimize optical modulator 100 for low-frequency response. This electrode may include one or more of an electro-optic, a thermal phase shifter and or MEMS shifter.

Electrode 120 includes a channel region 122 and extensions 124 (of which only one is labeled in FIGS. 1B-1C). Electrode 130 includes a channel region 132 and extensions 134 (of which only one is labeled in FIGS. 1B-1C). In some embodiments, extensions 124 or 134 may be omitted from electrode 120 or electrode 130, respectively. Extensions 124 and 134 protrude from channel regions 122 and 132, respectively. Thus, extensions 124 and 134 are closer to waveguide 110 than channel region 122 and 132, respectively, are. For example, the distance s (shown in FIG. 1C) from extensions 124 and 134 to waveguide ridge 112 is less than the distance w (shown in FIG. 1C) from channels 122 and 132 to waveguide ridge 112. The shape(s) of extensions 124 and 134 shown in FIG. 1B have been simplified for clarity. In the embodiment shown in FIGS. 1B-1C, extensions 124 and 134 are at substantially the same level as channel regions 122 and 132, respectively. In some embodiments, the extensions may protrude above and/or below the channel regions in addition to or in lieu of being at the same level.

Extensions 124 and 134 are in proximity to waveguide 110. For example, extensions 124 and 134 are a vertical distance, d from waveguide 110. The vertical distance to waveguide 110 may depend upon the cladding (not shown in FIGS. 1A-1C) used. The distance d is highly customizable in some cases. For example, d may range from zero (or less) if electrodes 120 and 130 contact or are embedded in thin film portion 114 to greater than the height of ridge 112. However, d is generally still desired to be sufficiently small that electrodes 120 and 130 can apply the desired electric field to waveguide 110. Extensions 124 and 134 are also a distance, s, from ridge 112. Extensions 124 and 134 are desired to be sufficiently close to waveguide 110 (e.g. close to ridge 112) that the desired electric field and index of refraction change can be achieved. However, extensions 124 and 134 are desired to be sufficiently far from waveguide 110 (e.g. from ridge 112) that their presence does not result in undue optical losses. Although the distance s is generally agnostic to specific geometry or thickness of waveguide 110, s may be selected to allow for both transverse electric and transverse optical modes that are confined differently in waveguide 110. However, the optical field intensity at extensions 124 and 134 (and more at particularly sections 124B and 134B) is desired to be reduced to limit optical losses due to absorption of the optical field by the conductors in extensions 124A and 124B. Thus, s is sufficiently large that the total optical loss for waveguide 110, including losses due to absorption at extensions 124 and 134, is not more than the ranges described above (e.g. 10 dB or less in some embodiments, 8 dB or less in some embodiments, 4 dB or less in some embodiments). In some embodiments, s is selected so that optical field intensity at extensions 124 and 134 is less than −10 dB of the maximum optical field intensity in waveguide 110. In some embodiments, s is chosen such that the optical field intensity at extensions 124 and 134 is less than −40 dB of its maximum value in the waveguide. For example, extensions 124 and/or 134 may be at least two micrometers and not more than 2.5 micrometers from ridge 112 in some embodiments.

In the embodiment shown in FIG. 1C, extensions 124 have a connecting portion 124A and a retrograde portion 124B. Retrograde portion 124B is so named because a part of retrograde portion may be antiparallel to the direction of signal transmission through electrode 120. Similarly, extensions 134 have a connecting portion 1234A and a retrograde portion 134B. Thus, extensions 124 and 134 have a "T"-shape. In some embodiments, other shapes are possible. For example, extensions 124 and/or 134 may have an "L"-shape, may omit the retrograde portion, may be rectangular, trapezoidal, parallelogram-shaped, may partially or fully wrap around a portion of waveguide 110, and/or have another shape. Similarly, channel regions 122 and/or 132, which are shown as having a rectangular cross-section, may have another shape. Further, extensions 124 and/or 134 may be different sizes, as indicated by FIG. 1B. Although all extensions 124 and 134 are shown as the same distance from ridge 112, some of extensions 124 and/or some of extensions 134 may be different distances from ridge 112. Channel regions 122 and/or 132 may also have a varying size. In some embodiments, extensions 124 and 134, respectively, are desired to have a length, l (e.g. l=w−s), that corresponds to a frequency less than the Bragg frequency of the signal for electrodes 120 and 130, respectively. Thus, the length of extensions 124 and 134 may be desired to be not more than the microwave wavelength of the electrode signal divided by π at the highest frequency of operation for electrodes 120 and 130. In some embodiments, the length of extensions 124 and 134 is desired to be less than the microwave wavelength divided by twelve. For example, if the maximum operation frequency is 300 GHz, which corresponds to a microwave wavelength of 440 micrometers in the substrate, extensions 124 and 134 are desired to be at smaller than approximately 37 micrometers. Individual extensions 124 and/or 134 may be irregularly spaced or may be periodic. Periodic extensions have a constant pitch. In some embodiments, the pitch is desired to be a distance corresponding to a frequency that is less than the Bragg frequency, as discussed above with respect to the length of extensions 124 and 134. Thus, the pitch for extensions 124 and 134 may be desired to be not more than the microwave wavelength of the electrode signal divided by π at the highest frequency of operation for electrodes 120 and 130. In some embodiments, the pitch is desired to be less than the microwave wavelength divided by twelve. In some embodiments, the pitch is desired to be less than the microwave wavelength divided by seventy two, allowing for a low ripple in group velocity.

Extensions 124 and 134 are closer to ridge 112 than channels 122 and 132, respectively, are (e.g. s<w). In some embodiments, a dielectric cladding (not explicitly shown in FIGS. 1A-1C) resides between electrodes 120 and 130 and waveguide 110. As discussed above, extensions 124 and 134 are desired to have a length (w−s) that corresponds to a frequency less than the Bragg frequency of the signal for electrodes 120 and 130, respectively. Extensions 124 and 134 are also desired to be spaced apart from ridge 112 as indicated above (e.g. such that the absorption loss in waveguide 110 can be maintained at the desired level, such as 10 dB or less). The length of the extensions 124 and 134 and desired separation from ridge 112 (e.g. s) are considered in determining w. Although described in the context of a horizontal distance for FIGS. 1A-1C, the distance between electrode structures and the waveguide also applies for vertical configurations. Other distances between waveguide 110/ridge 112 and channel regions 122 and/or 132 are possible.

Extensions 124 and 134 protrude from channel regions 122 and 132, respectively, and reside between channel regions 122 and 132, respectively, and waveguide 110/ridge 112. As a result, extensions 124 and 134 are sufficiently close to waveguide 110/ridge 112 to provide an enhanced electric field at waveguide 110/ridge 112. Consequently, the change in index of refraction induced by the electric field is increased. In contrast, channel regions 122 and 132 are spaced further from waveguide 110/ridge 112 than the extensions 124 and 134 (e.g. s<w). Thus, channel region 122 is less affected by the electric field generated by electrode 130/extensions 134. Electrical charges have a reduced tendency to cluster at the edge of channel region 122 closest to electrode 130. Consequently, current is more readily driven through central portions channel region 122 and the electrode losses in channel region 122 (and electrode 120) may be reduced. Similarly, channel region 132 is further from electrode 120. Channel region 132 is less affected by the electric field generated by electrode 120/extensions 124. Electrical charges have a reduced tendency to cluster at the edge of channel region 132 closest to electrode 120. Consequently, current is more readily driven through channel region 132 and the electrode losses in channel region 132 (and electrode 130) may be reduced. Microwave signal losses through electrodes 120 and 130 may, therefore, be reduced. A smaller driving voltage may, therefore, be utilized for electrode(s) 120 and/or 130 and less power may be consumed by optical modulator 100. In addition, the ability to match the impedance of electrode 120 with an input voltage device (not shown in FIGS. 1A-1C) may be improved. Such an impedance matching may further reduce electrode signal losses for optical modulator 100.

The length, d2, of connecting portion 124A and/or 134A may be selected so that the impedance of the electrode 120 and 130 respectively, is matched to that of a driver (not shown in FIGS. 1A-1F), e.g. 50Ω. In some embodiments, the gap between extensions 134 and 124 (in which waveguide ride 112 resides) may be configured to increase the electric field at waveguide ridge 112. In some embodiments, the gap between extensions 124 and 134 is at least one and not more than ten multiplied by the optical wavelength of the optical signal carried by waveguide 110. However, too small a gap may cause current crowding and microwave loss in the electrode(s) 120 and/or 130. In some embodiments, the width of a channel region 122 and/or 132 is selected to reduce microwave losses while attempting to match the microwave (electrode signal) velocity the optical signal velocity in waveguide 110. For example, electrode channel region 122 and/or 132 may have a width of at least two micrometers and not more than five hundred micrometers. The width of the retrograde portions 124B and/or 134B segments may be fine-tuned to allow low microwave losses while maintaining velocity matching and high frequency response range. For example, retrograde portions 124B and/or 134B may have a width (l−d2) of at least ten nanometers and not more than ten micrometers. The length, d3, of each retrograde portions 124B and/or 134B and the gap between adjacent retrograde portions 124B and/or 134 are chosen to allow efficient modulation and low microwave loss. For example, a duty cycle d3/(d3+d4) of at least 0.5 and not more than 0.9999 may be chosen in some embodiments. Other dimensions, including but not limited to those described herein, may be selected in some embodiments.

Electrode 120 may include electrode bending sections 125 (of which only one is labeled in FIG. 1B). Similarly, electrode 130 includes electrode bending sections (of which only one is labeled in FIG. 1B). Like waveguide bending sections 115 of waveguide 110, electrode bending sections 125 and 135 allow for a longer length of electrodes 120 and 130, respectively, in a smaller footprint. Thus, optical modulator 100 may consume less space, in particular length, in a package.

In some embodiments, electrode bending sections 125 and 135 and waveguide bending sections 115 may also be utilized to improve performance. More specifically, electrode bending sections 125 and 135 and waveguide bending sections 115 can be configured to provide a path difference between an optical signal for waveguide 110 and electrode signal(s) for electrode(s) 120 and/or 130. Such a path difference may be utilized to compensate for differences in the speed(s) of transmission between the microwave signal in electrode(s) 120 and/or 130 and the speed of transmission of the optical signal in waveguide 110. The speed of the optical signal through waveguide 110 is affected by the index of refraction of waveguide 110. The speed(s) of the microwave signal(s) in electrode(s) 120 and/or 130 are affected by the presence of extensions 124 and/or 134. Extensions 124 and/or 134 tend to slow the propagation of a microwave signal through electrode(s) 120 and/or 130. Surrounding materials, such as substrate/underlayers 101 can also affect the velocity of the electrode signal. The materials used for waveguide 110 and electrodes 120 and/or 130, fabrication techniques used for waveguide 110 and electrodes 120 and/or 130, the cladding and substrate/underlayers 101, and the configuration of extensions 124 and/or 134 may be selected to reduce the difference in velocities of the optical signal in waveguide 110 and the electrode signal in electrodes 120 and/or 130. Further, additional extensions that may be relatively far from ridge 112 (e.g. farther from ridge 112 than channels 122 and/or 132) may be added. Such extensions (not shown in FIGS. 1A-1F) might improve the matching between the velocities of the optical signal in waveguide 110 and the electrode signal in electrodes 120 and/or 130. However, there may still be some mismatch in optical and electrode signal velocities. Bending sections 115, 125 and 135 may compensate for these mismatches. For example, in some embodiments, waveguide bending sections 115 may be configured such that the optical signal traverses a longer path in waveguide 110 than the path the microwave signal traverses in electrode (s) 120 and/or 130. This path difference may compensate for the optical signal traveling faster in waveguide 110 than the microwave signal travels in electrode(s) 120 and/or 130. In some embodiments, waveguide bending sections 115 may be configured such that the optical signal traverses a shorter path in waveguide 110 than the path that the microwave signal traverses in electrode(s) 120 and/or 130. This path difference may compensate for the optical signal traveling slower in waveguide 110 than the microwave signal travels in electrode(s) 120 and/or 130. Such path differences may be used in addition to or instead of a meandering path for the waveguide (discussed below). Thus, for a given velocity mismatch between the microwave (electrode) and optical (waveguide) signals, the lengths of bending sections 115, 125 and 135 can be calculated to mitigate the differences introduced by the electrode and optical signals traveling at different velocities in the straight sections. By configuring the straight segments and the bending sections, velocity mismatches can be mitigated and the desired performance obtained. Thus waveguide bending sections 115 and electrode bending sections 125 and 135 can be utilized to account for mismatches in the velocities of the electrode (microwave) signal and the optical signal. Consequently, velocity and phase matching of optical and microwave signals may be improved.

In operation, an optical signal that is desired to be modulated is input to waveguide 110. An electrode signal, e.g. a microwave signal, is also applied to electrode(s) 120 and/or 130. For the purposes of explanation, it is assumed that the microwave signal is applied to electrode 120, while electrode 130 is ground. The time varying microwave signal through electrode 120 causes charges of a particular sign rapidly accumulate in an extension 124, drop back to zero in the extension 124, and charges of the opposite sign rapidly accumulate in the extension 124. A lack of negative charges in a particular extension 124 is considered the same as positive charges accumulating in the extension 124, and vice versa. This cycle is repeated at or around the frequency of the microwave signal. As a result of the accumulation of charges in extension 124, opposite charges accumulate in the corresponding extensions 134 nearby. A relatively large time varying electric field is generated between extensions 124 and 134. Because the electro-optic material in waveguide 110 is exposed to a larger time varying electric field, the index of refraction for waveguide 110 undergoes larger changes near extensions 124 and 134. Consequently, the optical signal is exposed to larger variations in index of refraction as the optical signal traverses waveguide 110 and passes extensions 124 and 134. Thus, a larger modulation in the optical signal may be achieved for a microwave signal of a given voltage amplitude applied to electrode 120. For example, optical modulator 100 may provide sufficient optical modulation at frequencies of up to 100-300 GHz or higher with a voltage amplitude of not more than one volt provided to electrode 120.

Further, because extensions 124 protrude from channel region 122, charges in channel region 122 are less affected by the large electric field generated between extensions 124 and 134. Consequently, the tendency of current to cluster near the edge of channel region 122 closer to waveguide 110/ridge 112 is mitigated and the resistive losses in electrode 120 reduced. Current may be more readily driven through channel region 122 at a lower voltage and microwave losses reduced.

In addition, as discussed above, the configuration of waveguide 110 and electrodes 120 and 130 may improve performance. The geometry of waveguide 110 and electrodes 120 and 130 may allow for bending sections 115, 125 and 135 to be used to address velocity mismatches between the optical and microwave signals. For example, an overall velocity mismatch of less than ten percent may be achieved. In some embodiments, a velocity mismatch of less than five percent may be attained. Phase mismatches between the microwave and optical signals may thus be reduced. Consequently, efficiency of optical modulator 100 is improved. Use of nonlinear optical materials in waveguide 110 and the configuration of waveguide 110 (e.g. smoother sidewalls of ridge 112) may not only increase the electro-optic effect (e.g. provide for larger modulations in index of refraction), but also reduce optical losses. Consequently, a longer waveguide 110, larger total change in index of refraction and thus an enhanced modulation of the optical signal may be achieved. Use of bending sections 115, 125 and 135 allows for the longer waveguide 110 to be provided in a smaller footprint. Further, reduced losses at higher frequency modulated optical signals may also be achieved. Thus, the usable bandwidth of optical modulator 100 may be increased.

Optical modulator 100 may thus not only reduce optical losses through waveguide 110, but also increase modulation of the optical signal through the use of a longer waveguide 110. Use of electrodes 120 and 130 having extensions 124 and 134, respectively, may reduce microwave losses, allow for a large electric field at waveguide 110/ridge 112 and improve the propagation of the microwave signal through electrodes 120 and 130, respectively. Bending sections 115, 125 and 135 may be configured to not only allow for optical modulator to consume less area, but also improve performance via velocity and phase matching. Consequently, performance of optical modulator 100 may be significantly enhanced.

This improvement in performance may be achieved for optical devices (e.g. 100 and/or 100') in which waveguide 110 includes or consists of electro-optic materials that have a microwave dielectric constant significantly exceeding the optical dielectric constant when used at the design microwave and optical frequencies. Here for non-magnetic materials, optical index is equal to or about the square root of the optical dielectric constant. For electro-optic materials in which the microwave dielectric constant significantly exceeds the optical dielectric constant (e.g. LN and LT), the microwave dielectric constant is at least 1.5 multiplied by the optical dielectric constant. In some cases, the microwave dielectric constant is at least 2 multiplied by the optical dielectric constant. In some instances, the microwave dielectric constant is at least 5 multiplied by the optical dielectric constant. In some such materials, the microwave dielectric constant is at least 10 multiplied by the optical dielectric constant. In some embodiments, therefore, the waveguide 110' including (or consisting of) such materials has a microwave dielectric constant that exceeds the optical dielectric constant (e.g. by a factor of at least 1.5, 2, 5, 10 or more). The optical dielectric constant and microwave dielectric constant affect the speed of transmission of the optical and microwave signals, respectively. The higher the optical dielectric constant, the lower the speed of transmission of the optical signal. Similarly, the higher the microwave dielectric constant, the lower the speed of transmission of the microwave signal.

Although the optical mode is generally well confined to the waveguide (e.g. ridge 112), the microwave mode may extend significantly outside of the electrodes. For example the microwave mode may extend into the waveguide. For bulk and other optical devices including waveguides formed of materials having a microwave dielectric constant that is large in comparison to the optical dielectric constant (e.g. LN and/or LT), the speed of transmission of the microwave signal in the waveguide material is reduced to a greater degree than the speed of the optical signal. Features in the electrodes, such as extensions, may also slow the transmission of the electrode signal in the electrodes. Thus, the velocity mismatch between the optical signal and the electrode signal is expected to be exacerbated by electrodes having features such as extension. In general, use of features such as extensions is disfavored in situations in which the waveguide material has a significantly larger microwave dielectric constant than optical dielectric constant (e.g. as for bulk LN and/or LT waveguides). Stated differently, the use of features on the electrodes is generally limited to cases in which the microwave dielectric constant of the waveguide material(s) is not significantly greater (e.g. by less than a factor of 1.5), about the same as, or less than the optical dielectric constant of the waveguide material(s) (e.g. III-V compounds materials such as indium phosphide and gallium arsenide).

In contrast, for optical device 100, thin film waveguide 110 is used. In general, the optical mode is well confined to waveguide 110 (e.g. to ridge portion 112). The optical dielectric constant of waveguide 110 thus determines the velocity of the optical signal in waveguide 110. However, the microwave mode for the microwave signal in electrodes 120 and/or 130 may extend over many structures. The velocity of the microwave signal through electrodes 120 and 130 may thus be found using the microwave dielectric constant of multiple structures such as electrodes 120 and 130, waveguide 110, cladding (not shown in FIGS. 1A-1F) between substrate/underlayer(s) 101 and electrodes 120 and 130, substrate/underlayers 101, and air or any structures (not shown) above electrodes 120 and 130. Thus, the contribution of the (large) microwave dielectric constant of waveguide 110' materials (e.g. LT and LN) may be mitigated by the (lower) microwave dielectric constant of surrounding structures. As such, the velocity mismatch between the optical signal in waveguide 110' and the electrode signal for electrode(s) 120' and/or 130' may still be mitigated while achieving the other benefits of extensions 124' and/or 134'.

FIGS. 1D-1E depict another embodiment of an optical modulator 100'. Optical modulator 100' is analogous to optical modulator 100. Consequently, similar structures have analogous labels. Thus, optical modulator 100' includes waveguide 110' and electrodes 120' and 130' that are analogous to waveguide 110 and electrodes 120 and 130, respectively. Similarly, electrodes 120' and 130' include channel regions 122' and 132', respectively, that are analogous to channel regions 122 and 132 for electrodes 120 and 130, respectively. Electrodes 120' and 130' include extensions 124' and 134', respectively, that are analogous to extensions 124 and 134 for electrodes 120 and 130, respectively. Extensions 124' and 134' include connecting portions 124A' and 134A' and retrograde portions 124B' and 134B' that are analogous to connecting portions 124A and 134A and retrograde portions 124B and 134B. Bending portions 115', 125' and 135' of waveguide 110' and electrodes 120' and 130' are analogous to bending portions 115, 125 and 135, respectively. In some embodiments, bending portions may be omitted such that waveguide 110' and electrodes 120' and 130' are straight.

In some embodiments, optical modulator 100 has an electro-optic effect in the plane of thin film region 114 (e.g. is an x-cut or y-cut modulator). Optical modulator 100' has an electro-optic effect out of the plane of thin film region 114' (e.g. is a z-cut optical modulator). Consequently, a vertical electrical field is desired to be applied to waveguide 110'. Thus, optical modulator 100' includes electrode 140' including extensions 144' having connecting portion 144A' and retrograde portion 144B'. Extensions 144' are analogous to extensions 124, 134, 124' and 134'. Thus, the discussion herein with respect to extensions 124 and 134 also applies to extensions 144'. For example, distances s' and w' correspond to distance s and w, respectively. Because optical modulator 100' utilizes vertical electrical fields, waveguide 110' need not cross electrodes 120' and 130'. This is indicated in FIG. 1D. Optical modulator 100' also shares some or all of the benefits of optical modulator 100. Thus, optical modulators having an electro-optic effect out-of-plane and having improved performance may also be provided.

FIG. 1F depicts an embodiment of optical modulator 150. Optical modulator 150 is analogous to optical modulator(s) 100 and/or 100'. Consequently, similar structures have analogous labels. Thus, optical modulator 150 includes waveguide 160 and electrodes 170 and 180 that are analogous to waveguide 110/110' and electrodes 120/120' and 130/130', respectively. Electrodes 170 and/or 180 include extensions 174 and 184 and channel regions 172 and 182 analogous to extensions 124/124' and 134/134 and to channel regions 122/122' and 132/132'. Although configured in an analogous manner to optical modulator 100, in some embodiments, optical modulator 150 may be configured in a manner more similar to optical modulator 100'. For example, optical modulator 150 may be an x-cut, a y-cut or a z-cut modulator. However, optical modulator 150 omits bending sections. Thus, optical modulator is 150 is straight. Consequently, in some embodiments, straight optical modulators excluding bending sections but which share some or all of the benefits of optical modulators 100 and/or 100'

Figure 2A:
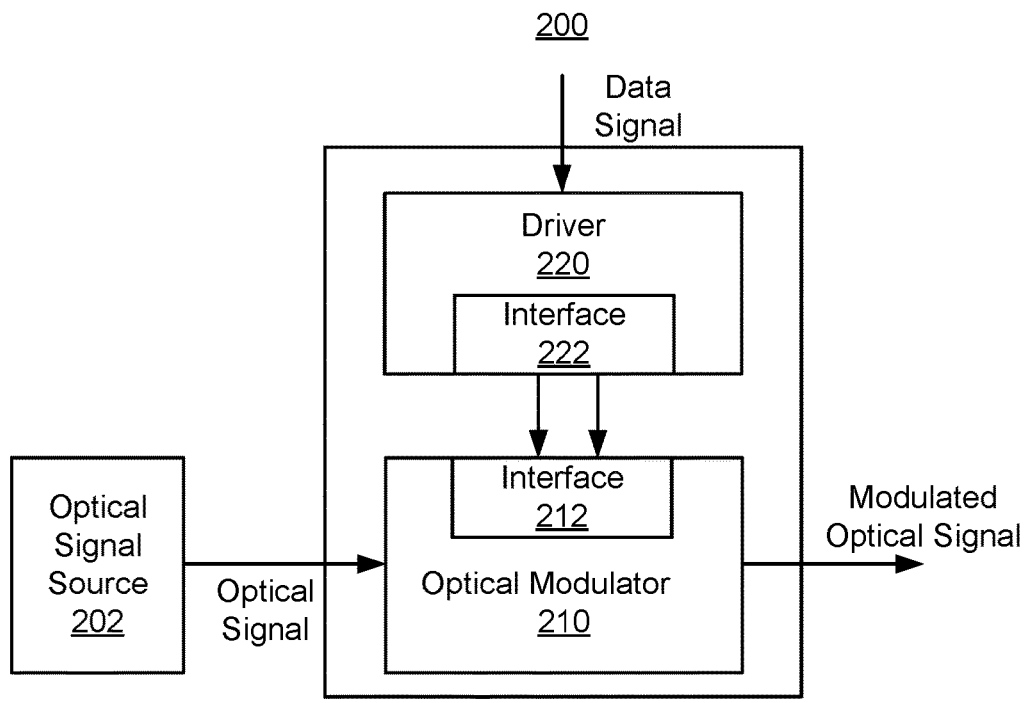
FIGS. 2A-2D depict embodiments of optical devices and the interfaces therein.
Figure 2B:
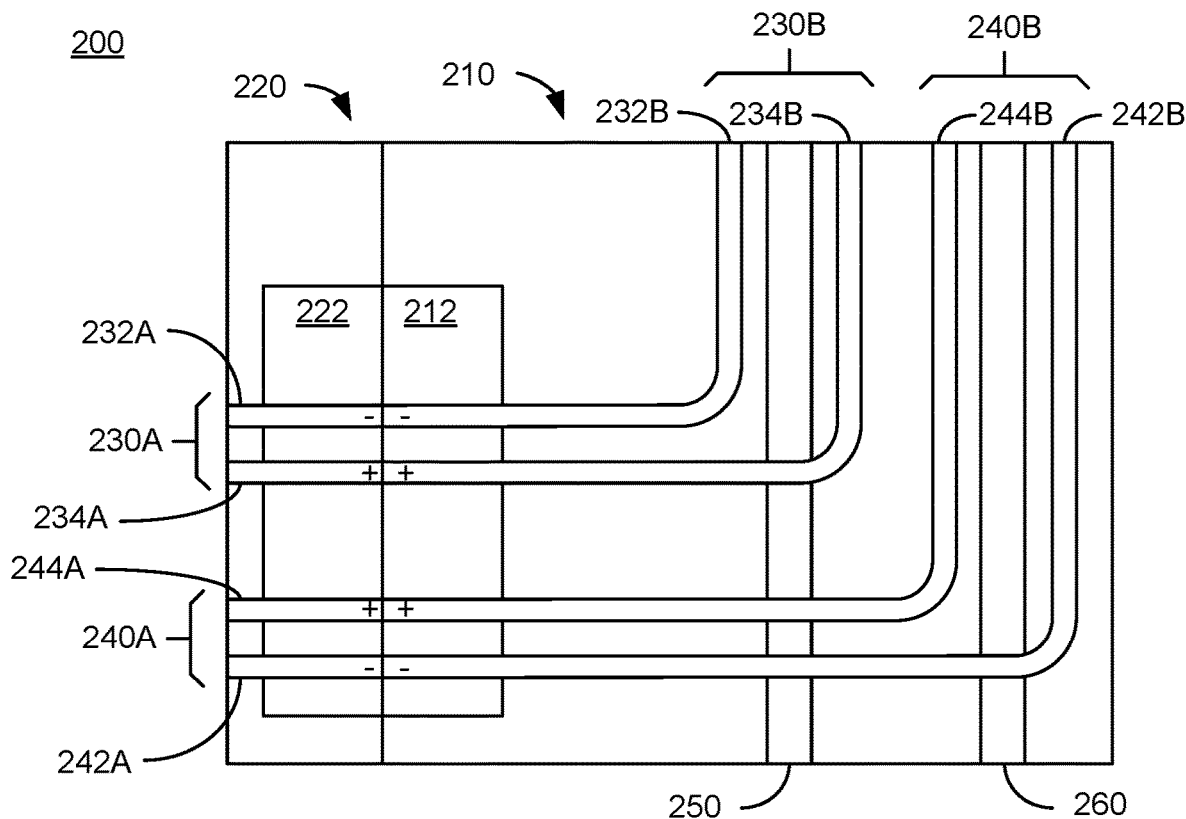
Figure 2C:
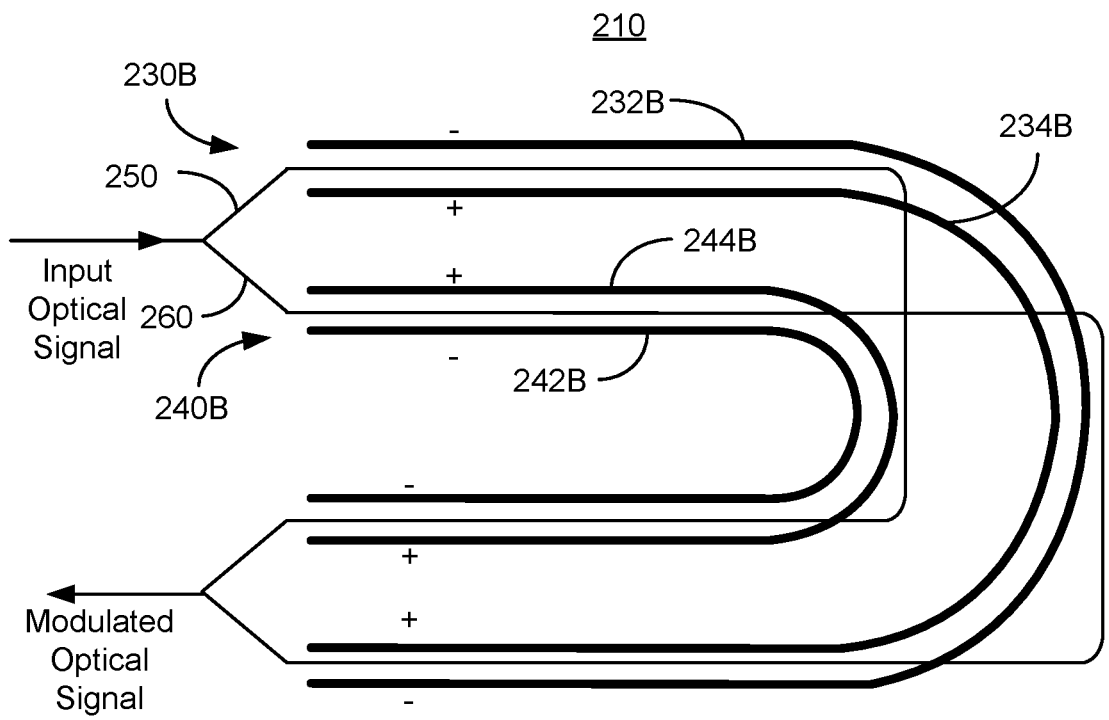
Figure 2D:
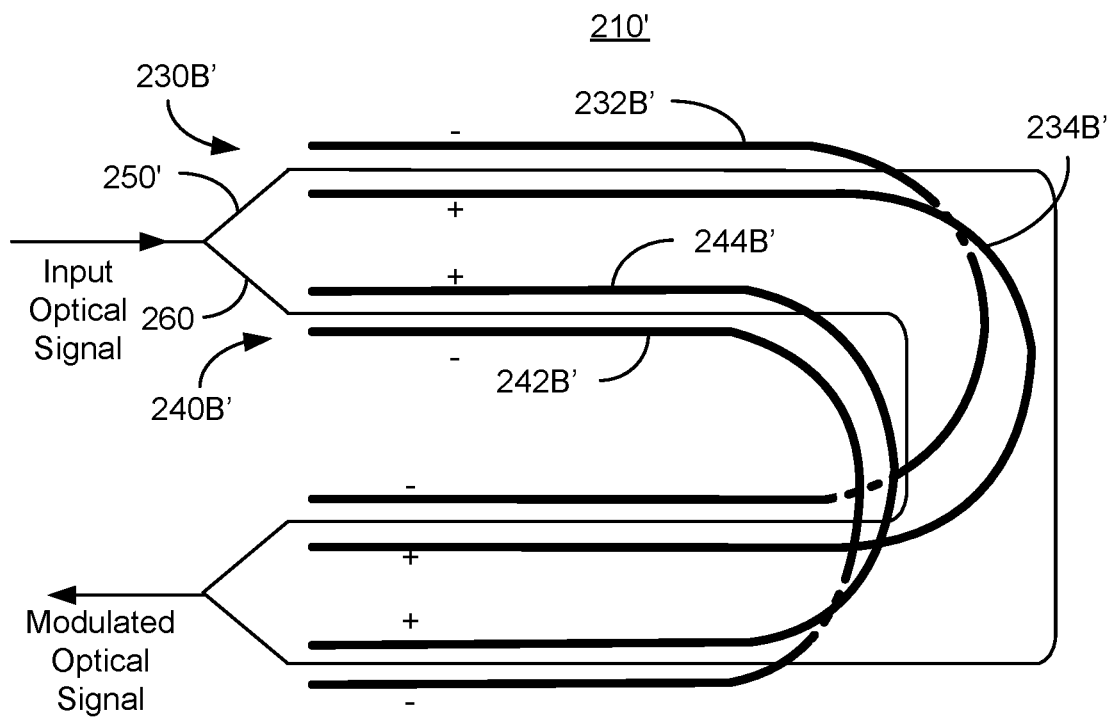

FIGS. 2A-2C depict an embodiment of optical device 200. FIG. 2A is a block diagram of optical device 200 including optical modulator 210 and driver 220. FIG. 2B depicts a plan view of portions of optical modulator 210 and driver 220. FIG. 2C depicts a plan view of portions of optical modulator 210. FIG. 2D depicts portions of an alternative optical modulator 210' that is analogous to optical modulator 210. In the embodiments shown, either the optical waveguide (in optical modulator 210 of FIGS. 2A-2C) or the electrodes (in optical modulator 210' of FIG. 2D) cross in the bend region. In some embodiments, crossing waveguides 250 and 260 (as in optical modulator 210 of FIG. 2C) instead of crossing electrodes 232B', 234B', 242B', and 244B' (as in optical modulator 210' of FIG. 2D) allows for simpler fabrication and waveguides having the same length in the bending sections, which may be desirable. For clarity, FIGS. 2A-2D are not to scale. For example, the optical lengths in the bends may be configured to be the same. However, for clarity, waveguides in FIGS. 2A-2D appear as having different lengths in the bend. Thus, the lengths shown herein are for explanatory purposes. In addition to optical device 200, optical signal source 202 (e.g. one or more lasers) and an input signal to driver 220 are shown. In the embodiment shown, the input signal is a data signal that is used to modulate the optical signal provided by optical signal source 202.

Optical device 200 is shown as including driver 220. Because electrodes for optical modulator 210 may be driven using a lower voltage, driver 220 may be omitted. Thus, in some embodiments, optical modulator 210 may be driven by the input data signal for optical device 200. In other embodiments, driver 220 may be utilized. However, a lower voltage may be employed. In some embodiments, driver 220 is a separate component. For example, driver 220 may not be on the same integrated circuit as optical modulator 210. In other embodiments, driver 220 may be an on-chip driver incorporated onto the integrated circuit on which optical modulator 210 is formed. Driver 220 may thus be a radio frequency (e.g. microwave) driver. In some embodiments, driver 220 is a differential driver. In some embodiments, driver 220 is a single-ended driver. In some embodiments, driver 220 is a differential driver and may be a low-power differential driver. For example, in some embodiments, driver 220 may have an output voltage amplitude of two volts. In some embodiments, driver 220 has a voltage amplitude of not more than 1.5 volts. Driver 220 may have a voltage amplitude of not more than one volt. In some embodiments, driver 220 has a voltage amplitude of not more than 0.5 volt. Thus, in some embodiments, driver 220 may be a CMOS driver.

Optical modulator 210 may be analogous to one or more of optical modulators 100, 100', and/or 150. Thus, optical modulator 210 may have analogous benefits to optical modulator(s) 100, 100', and/or 150. Optical modulator 210 is configured as a differential modulator. Optical modulator 210 includes waveguides 250 and 260 as well as electrode (or line) pairs 230B and 240B which are analogous to waveguide(s) 110, 110' and/or 160 and electrode(s) 120, 130, 120', 130', 170 and/or 180. Waveguides 250 and/or 260 may be low loss waveguide(s) including ferroelectric nonlinear optical material(s), such as LN and/or LT, Waveguides 250 and 260 include bending sections, which are shown in FIG. 2C. In other embodiments, waveguides 250 and/or 260 may not include bending sections and/or may not cross. In some embodiments, electrode(s) 232B, 234B, 242B and/or 244B include extensions and channel regions. In the embodiment shown, electrodes 232B, 234B, 242B and 244B include electrode bending sections, which are also shown in FIG. 2C. In FIG. 2D, electrodes 232B', 234B', 242B' and 244B' are shown as dashed lines to indicate that although electrodes 232B', 234B', 242B' and 244B' appear to cross in FIG. 2D, electrodes 232B', 234B', 242B' and 244B' are not electrically connected in the region shown. Optical modulators 210 and 210' allow for velocity matching between microwave and optical signals, low microwave loss features, low voltage electrode signals, low optical losses, longer waveguides that occupy a smaller amount of area and/or other features described herein may be combined in manner(s) not explicitly shown.

Electrode pairs 230B and 240B are differential electrode pairs. Electrodes 232B and 242B are negative electrodes, while electrodes 234B and 244B are positive electrodes. Thus, electrodes (or lines) 234B and 244B may be considered to carry a signal having an amplitude of +V, while lines (or electrodes) 232B and 242B carry a signal having an amplitude of −V. However, as discussed above, the terms positive and negative with respect to electrodes 232B and 242B merely refer signals that are opposite in polarity with respect to a reference (which is generally zero). A signal amplitude of 2V may, therefore, be provided across waveguides 250 and 260. Although optical modulator 210 may have a zero bias, in some embodiments, optical modulator 210 may have a nonzero bias. In such embodiments, negative electrodes 232B and 242B carry signals having polarities that are opposite to the signals carried by positive electrodes 234B and 244B with respect to the (nonzero) bias. Further, the signal carried by positive electrode 234B is analogous to the signal carried by positive electrode 244B. Stated differently, there may be no voltage difference between positive electrodes 234B and 244B. Thus, in some embodiments, positive electrodes 234B and 244B might be a common positive electrode. Similarly, the signal carried by negative electrode 232B is analogous to the signal carried by negative electrode 242B. Thus, in some embodiments, negative electrodes 232B and 242B might be a common electrode or shorted. For example, the locations of negative electrodes 232B and 242B might be switched with the locations of positive electrodes 234B and 244B, respectively. In such embodiments, negative electrodes 232B and 242B may be a common electrode. Although not shown, electrodes 232B, 234B, 242B and 244B are generally terminated on-chip or off-chip to ensure that the signals carried by electrodes 232B, 234B, 242B and 244B are dissipated as desired.

In the embodiment shown, waveguides 250 and 260 are split from an input for a common optical input signal (from optical signal source 202 shown). The modulated signals are recombined and output as indicated in FIG. 2C. In some embodiments, waveguides 250 and/or 260 may be configured differently. For example, waveguide 250 or 260 might be omitted, fewer bending sections (including zero) may be included and/or more bending sections may be used. Waveguides 250 and 260 and electrode pairs 230B and 240B are also configured such that electrodes having the same polarity are between waveguides 250 and 260. Thus, positive electrodes 234B and 244B are located between waveguides 250 and 260, while waveguides 250 and 260 are located between negative electrodes 232B and 242B. As discussed above, the terms positive and negative refer signals that are opposite in polarity. Thus, in some embodiments, electrodes 234B and 244B may be negative, while electrodes 232B and 242B may be positive. In other embodiments, waveguides 250 and 260 are located between positive electrodes 234B and 244B and negative electrodes 232B and 242B are between waveguides 250 and 260. Electrode pair 230B modulates the optical signal carried by waveguide 250, while electrode pair 240B modulates the optical signal carried by waveguide 260. Thus, electrodes 232B and 234B are in proximity to waveguide 250. The distances between electrodes 232B and 234B and waveguide 250 are analogous to those described with respect to FIGS. 1A-1F. Similarly, electrodes 242B and 244B are in proximity to waveguide 260. The distances between electrodes 242B and 244B and waveguide 260 are analogous to those described with respect to FIGS. 1A-1F. Electrode pairs 230B and 240B are further from waveguides 260 and 250, respectively. For example, electrodes 232B and 234B of electrode pair 230 may be at least five micrometers from waveguide 260. In some embodiments, electrodes 232B and 234B of electrode pair 230 are at least ten micrometers from waveguide 260. In some embodiments, electrodes 232B and 234B of electrode pair 230 are at least twenty micrometers from waveguide 260. In some embodiments, electrodes 232B and 234B of electrode pair 230 are at least fifty micrometers from waveguide 260. Thus, the electrode signal carried by differential electrode pair 230B leaves the optical signal in waveguide 260 substantially unaffected. Similarly, the electrode signal in differential electrode pair 240B leaves the optical signal in waveguide 250 substantially unmodulated and may be located a similar distance from waveguide 250.

Optical modulator 210 and driver 220 include interfaces 212 and 222, respectively, through which optical modulator 210 and driver 220 are connected. This connection is depicted in FIG. 2A by arrows. However, connection is typically a physical and electrical connection. For example, interfaces 212 and 222 may be female and male components of a socket. Thus, FIG. 2B depicts driver 220 and optical modulator 210 in proximity and connected at interfaces 222 and 212.

Interface 222 of driver 220 includes line pairs 230A and 240A. Line pairs 230A and 240A are differential line pairs. Lines 232A and 242A are negative lines, while lines 234A and 244A are positive lines. As discussed above, the terms positive and negative refer signals that are opposite in polarity. Thus, positive lines 234A and 244A carry a signal having one polarity, while negative lines 232A and 242A carry a signal having the opposite polarity. Positive lines 234A and 244A may be considered to carry a signal having an amplitude of +V, while negative lines 232A and 242A carry a signal having an amplitude of −V. Alternatively, lines 234A and 244A may be considered to carry a signal having an amplitude of −V, while lines 232A and 242A may carry a signal having an amplitude of +V. Driver 220 may thus be considered to provide a 2V peak-to-peak voltage. Although optical modulator 210 may generally have a zero bias, in some embodiments, optical modulator 210 may have a nonzero bias. In such embodiments, negative lines 232A and 242A carry signals having polarities that are opposite to the signals carried by positive lines 234A and 244A with respect to the (nonzero) bias. Further, the signal carried by positive line 234A is analogous to the signal carried by positive line 244A. Thus, in some embodiments, lines positive 234A and 244A might be a common line. Similarly, the signal carried by negative line 232A is analogous to the signal carried by negative line 242A. Thus, in some embodiments, negative lines 232A and 242A might be a common line.

Interface 212 of optical modulator 210 includes line pairs 230B and 240B (also termed electrode pairs 230B and 240B and/or considered to be connected to electrode pairs 230B and 240B). Line pairs 230B and 240B are differential line pairs. Lines 232B and 242B are negative lines, while lines 234B and 244B are positive lines. As discussed above, the terms positive and negative refer signals that are opposite in polarity. Thus, positive lines (or electrodes) 234B and 244B may be considered to carry a signal having an amplitude of +V, while negative lines (or electrodes) 232B and 242B carry a signal having an amplitude of −V. Alternatively, lines 234A and 244A may be considered to carry a signal having an amplitude of −V, while lines 232A and 242A may carry a signal having an amplitude of +V. Consequently, a 2V peak-to-peak voltage and attendant improvements may be achieved. Although optical modulator 210 may generally have a zero bias, in some embodiments, optical modulator 210 may have a nonzero bias. In such embodiments, lines negative 232B and 242B carry signals having polarities that are opposite to the signals carried by positive lines 234B and 244B with respect to the (nonzero) bias. Further, the signal carried by line positive 234B is analogous to the signal carried by positive line 244B. Thus, in some embodiments, positive lines 234B and 244B might be a common line. Similarly, the signal carried by negative line 232B is analogous to the signal carried by negative line 242B. Thus, in some embodiments, negative lines 232B and 242B might be a common line. Further, interfaces 212 and 222 have a matching number of electrodes and line pairs. In some embodiments, therefore, a different number of electrodes and lines might be used. For example, in another embodiment, an analogous optical modulator may have eight electrodes (e.g. four pairs of differential electrodes) at the interface of the optical modulator. The corresponding driver could have eight lines (e.g. four pairs of differential lines) at its interface. Thus, the driver and optical modulator are configured to be electrically connected.

Because differential signals are used, a virtual ground may reside between electrodes of opposite polarity. For example, a virtual ground may be between electrodes 232B and 234B and between electrodes 242B and 244B. The presence of the virtual ground may affect the impedance of electrodes 232B, 234B, 242B and 244B. For example, the impedance of positive, central electrodes 234B and 244B may be reduced. In some embodiments, driver 220 is adjusted to account for this difference and to provide impedance matching between driver 220 and optical modulator 210. Thus, positive lines 234A and 244A may have a lower impedance than negative lines 232A and 242A. In some embodiments, the configuration of electrodes positive 234B and 244B may account for the virtual ground. For example, positive electrodes 234B and/or 244B may be placed closer to waveguides 250 and/or 260, respectively, or otherwise modified to tailor their impedance. Thus, the impedances of electrodes 232B, 234B, 242B, and 244B are still desired to be matched (e.g. to within twenty percent) of lines 232A, 234A, 242A, and 244A. In some embodiments, the impedances are matched to within ten percent. In some embodiments, the impedances are matched to within five percent or less.

In operation, an optical signal is provided to waveguides 250 and 260 from optical source 202. Driver 220 provides differential signals on differential line pairs 230A and 240A. In some embodiments, driver 220 may be considered to include two differential drivers, one for each differential line pair 230A and 240A. At interfaces 222 and 212, differential line pairs 230A and 240A are connected with differential line pairs 230B and 240B, respectively. Differential signals in pairs 230A and 240A are thus provided to differential line/electrode pairs 230B and 240B, respectively. These differential signals are brought into proximity to waveguides 250 and 260, primarily in the long, straight regions in which waveguide 250 is between electrodes 232B and 234B and in which waveguide 260 is between electrodes 242B and 244B. In these regions, the optical signals in waveguides 250 and 260 are modulated. The modulated optical signals in waveguides 250 and 260 are recombined and output.

Optical device 200 may have improved performance. Because optical modulator 210 is configured in a manner analogous to optical device(s) 100, 100', and/or 150 the benefit(s) of devices 100, 100', and/or 100' may be achieved for optical device 200. For example, optical modulator 210 may have low optical losses, low microwave losses, an enhanced vπ, and/or improved velocity matching. In addition, using interfaces 212 and 222, a lower voltage, lower power signal may be driven through electrode pairs 230B and 240B. This lower voltage amplitude differential signal may still provide the desired modulation in the first and/or second waveguide. For example, differential driver 220 may have a voltage amplitude of not more than two volts yet may be capable of providing a phase shift of π in the waveguide (s). In some embodiments, the voltage amplitude may be less (e.g. not more than 1.5 volts, not more than one volt, or not more than 0.5 volt) for the same phase shift. Thus, performance of the modulator 210, or other ferroelectric nonlinear optical device, may be improved. In addition, driver 220 may be a low power driver, such as a CMOS driver. However, because driver 220 and optical modulator 210 are in a differential configuration, a larger peak-to-peak voltage, and attendant electric field, may be provided at waveguides 250 and 260. Consequently, a larger optical signal modulation may be achieved for a smaller driver voltage. In addition, waveguides 250 and 260 do not require an additional bias voltage. This is in contrast to conventional semiconductor waveguides. Consequently, driver 220 can, but need not provide an additional constant bias voltage on lines 232A, 234A, 242A, 244A or electrodes 232 B, 234B, 242B and/or 244B. Performance may thus be improved.

Figure 3:
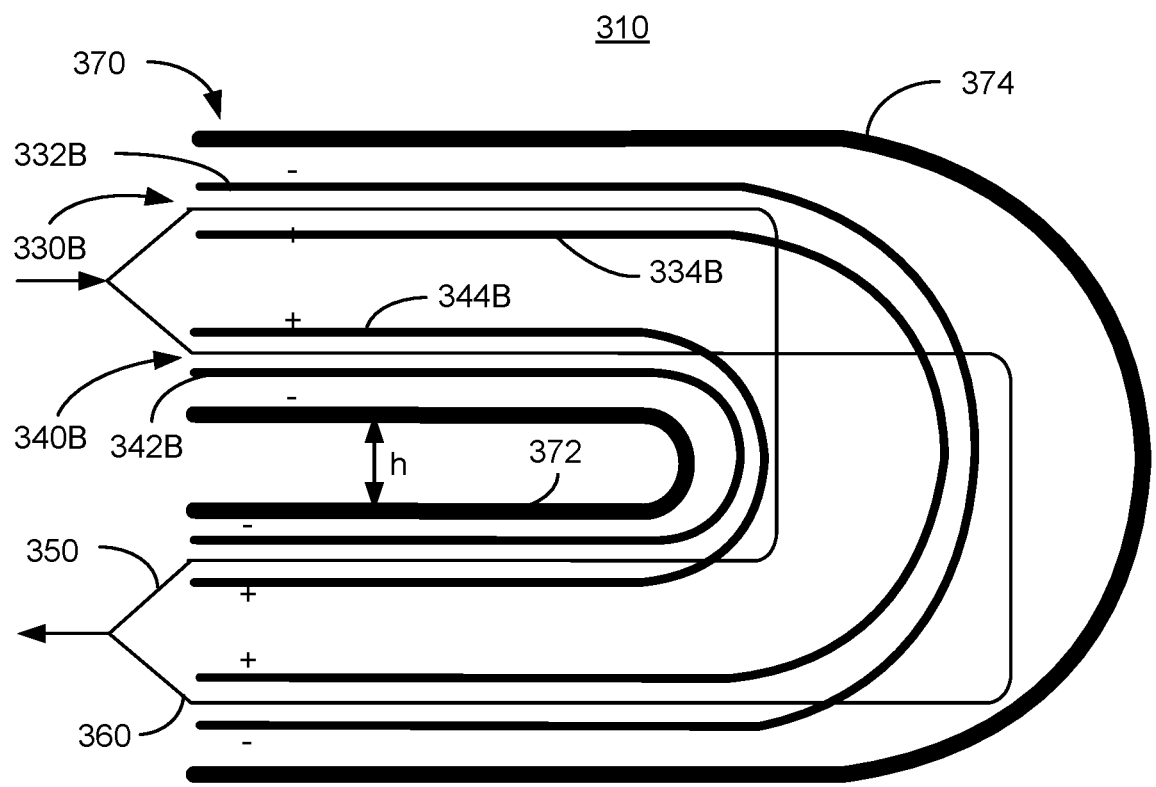
FIG. 3 depicts an embodiment of a portion of an optical device.

FIG. 3 depicts a plan view of a portion of an embodiment of optical modulator 310. For clarity, FIG. 3 is not to scale. Optical modulator 310 is analogous to optical modulator 210. Thus, optical modulator 310 may be used in conjunction with a driver such as driver 220, may be used in an optical device analogous to optical device 200, and/or may include an interface (not shown) analogous to interface 212. Optical modulator 310 includes electrode pair 330B including electrodes 332B and 334B, electrode pair 340B including electrodes 342B and 344B, waveguide 350 and waveguide 360 that are analogous to electrode pair 230B including electrodes 232B and 234B, electrode pair 240B including electrodes 242B and 244B, waveguide 250 and waveguide 260, respectively. Although waveguides 350 and 360 are shown as crossing and electrodes 232B, 234B, 242B and 244B are shown as not crossing, in other embodiments, waveguides may not cross and electrodes may cross. Although not shown, electrodes 332B, 334B, 342B and 344B are generally terminated on-chip or off-chip to ensure that the signals carried by electrodes 332B, 334B, 342B and 344B are dissipated.

In addition, optical modulator 310 includes ground pair 370 including ground electrodes 372 and 374. Ground pair 370 is configured such that ground electrodes 372 and 374 reside outside of electrode pairs 330B and 340B. Ground pair 370 is also configured such that waveguides 350 and 360 are between ground electrodes 372 and 364 in the region where electrode pairs 330B and 340B are in proximity to waveguides. Ground electrode(s) 372 and/or 374 may include extensions and channel regions in some embodiments. Ground electrodes 372 and 374 also include bending sections. In some embodiments, bending sections may be omitted. The bending radius (i.e. h/2 for ground electrode 372) is also configured such that the sections of the ground electrode on either side of the bending section are separated by at least one micrometer (i.e. h≥1 micrometer). In some embodiments, the bending radius is configured such that the sections of the ground electrode on either side of the bending section are separated by at least ten micrometers (i.e. h≥10 micrometers). In some embodiments, ground electrodes 372 and 374 may be coupled, for example to a ground plane (not shown).

Optical modulator 310 may have improved performance. Optical modulator 310 may have benefits analogous to those of optical device 200, such as the use of a low power driver, low optical losses, low microwave losses, an enhanced vπ, improved velocity matching, and/or a larger optical signal modulation may be achieved for a differential driver having a smaller voltage amplitude. In addition, optical modulator includes ground electrodes 372 and 374 that may enhance performance. Further, use of a minimum separation (e.g. h) between sections of the ground electrodes 372 and 374 may reduce reflections. Thus, noise may be reduced.

Figure 4:
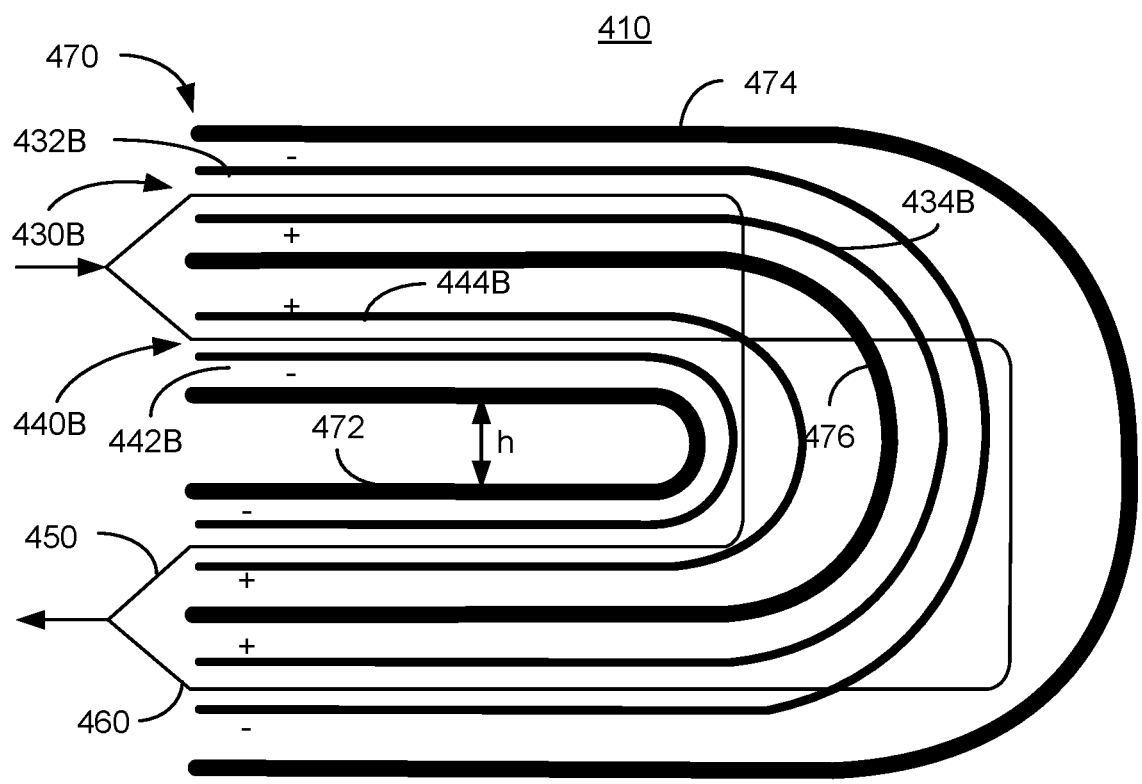
FIG. 4 depicts an embodiment of a portion of an optical device.

FIG. 4 depicts a plan view of a portion of an embodiment of optical modulator 410. For clarity, FIG. 4 is not to scale. Optical modulator 410 is analogous to optical modulator 210 and/or 310. Thus, optical modulator 410 may be used in conjunction with a driver such as driver 220, may be used in an optical device analogous to optical device 200, and/or may include an interface (not shown) analogous to interface 212. Optical modulator 410 includes electrode pair 430B including electrodes 432B and 434B, electrode pair 440B including electrodes 442B and 444B, waveguide 450 and waveguide 460 that are analogous to electrode pair 230B including electrodes 232B and 234B, electrode pair 240B including electrodes 242B and 244B, waveguide 250 and waveguide 260, respectively. Electrode pair 430B including electrodes 432B and 434B, electrode pair 440B including electrodes 442B and 444B, waveguide 450 and waveguide 460 are also analogous to electrode pair 330B including electrodes 332B and 334B, electrode pair 340B including electrodes 342B and 344B, waveguide 350 and waveguide 360, respectively. Optical device 410 also includes ground pair 470 having ground electrodes 472 and 474 that is analogous to ground pair 370 having ground electrodes 372 and 374. For example, the bending radius of ground electrode 472, h/2, is analogous to the bending radius of electrode 372.

In addition, optical device 410 includes ground 476 between positive electrodes 434B and 444B. Instead of floating, this region of optical modulator 410 is grounded. Ground electrode 476 may include extensions and channel regions in some embodiments. Ground electrode 476 also includes bending sections. In some embodiments, bending sections may be omitted.

Optical modulator 410 may have improved performance. Optical modulator 410 may have benefits analogous to those of optical device 200 and optical modulator(s) 210 and/or 310. For example, optical modulator 410 may allow for use of a low power driver, low optical losses, low microwave losses, an enhanced vπ, improved velocity matching, and/or a larger optical signal modulation may be achieved for a differential driver having a smaller voltage amplitude. Use of a minimum separation (e.g. h) between sections of the ground electrodes 472, 474 and 376 may reduce reflections and result in a smaller device footprint. Thus, noise device size may be reduced. Thus, optical modulator 410 may have improved performance.

Figure 5:
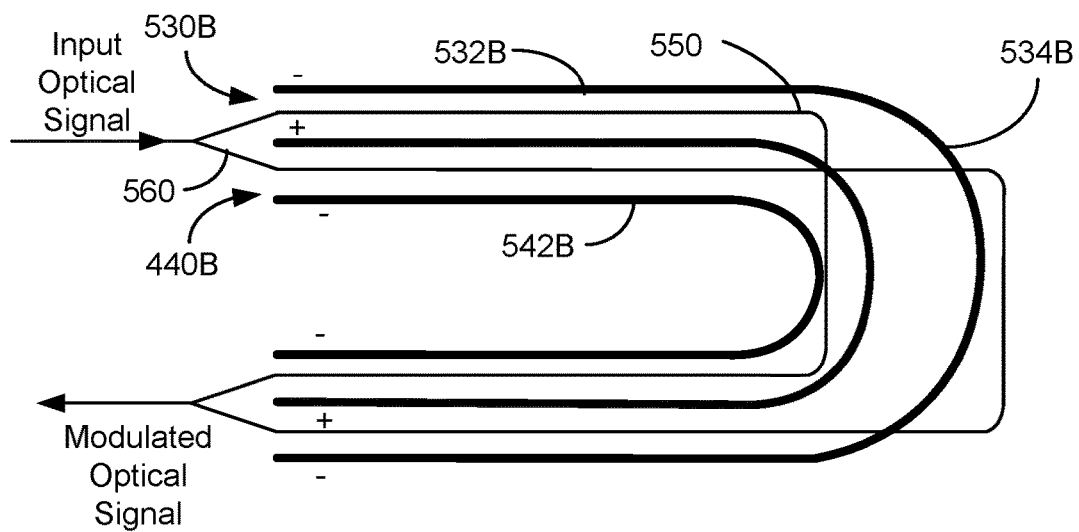
FIG. 5 depicts an embodiment of a portion of an optical device.

FIG. 5 depicts a plan view of a portion of an embodiment of optical modulator 510. For clarity, FIG. 5 is not to scale. Optical modulator 510 is analogous to optical modulator 210, 310 and/or 410. Thus, optical modulator 510 may be used in conjunction with a driver such as driver 220, may be used in an optical device analogous to optical device 200, and/or may include an interface (not shown) analogous to interface 212. Optical modulator 510 includes electrode pair 530B including electrodes 532B and 534B, electrode 542B, waveguide 550 and waveguide 560 that are analogous to electrode pair 230B including electrodes 232B and 234B, electrode 242B, waveguide 250 and waveguide 260, respectively. Electrode pair 530B including electrodes 532B and 534B, electrode 542B, waveguide 550 and waveguide 560 are also analogous to electrode pair 330B including electrodes 332B and 334B, electrode 342B, waveguide 350 and waveguide 360, respectively. Electrode pair 530B including electrodes 532B and 534B, electrode 542B, waveguide 550 and waveguide 560 are also analogous to electrode pair 430B including electrodes 432B and 434B, electrode 442B, waveguide 450 and waveguide 460, respectively.

Optical modulator 510 thus includes a single positive electrode 534B, instead of two positive electrodes (e.g. electrodes 234B and 244B). As discussed above, the terms positive and negative refer signals that are opposite in polarity. In some embodiments, positive electrode 534B can be viewed as a common positive electrode. Thus, the interface (not shown) for optical modulator 510 as well as the interface for the corresponding driver may include three signal terminals (e.g. −V, +V, −V or for opposite polarity, +V, −V, +V). Although not depicted, optical modulator 510 may include ground electrodes analogous to electrodes 372, 374, 472 and/or 474.

Optical modulator 510 may have improved performance. Optical modulator 510 may have benefits analogous to those of optical device 200 and optical modulator(s) 210, 310 and/or 410. For example, optical modulator 510 may allow for use of a low power driver, low optical losses, low microwave losses, an enhanced vπ, improved velocity matching, and/or a larger optical signal modulation may be achieved for a differential driver having a smaller voltage amplitude. Use of a minimum separation (e.g. h) between sections of the ground electrodes (not shown) may reduce reflections. In addition, the architecture has been simplified by the use of single positive electrode 534B. Thus, performance of optical modulator 510 may be enhanced.

Figure 6:
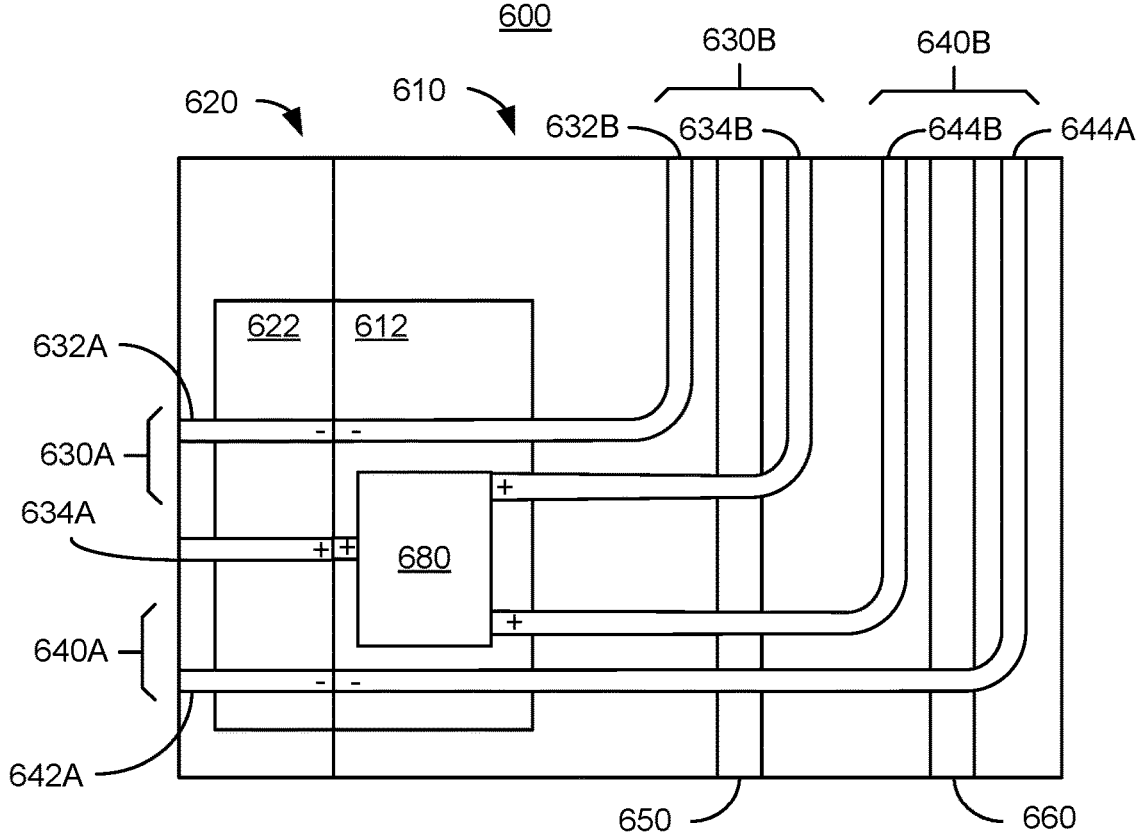
FIG. 6 depicts an embodiment of a portion of an optical device.

FIG. 6 depicts a plan view of a portion of an embodiment of optical device 600. For clarity, FIG. 6 is not to scale. Optical device 600 includes driver 620 and optical modulator 610. Optical device 600 is analogous to optical device 200. Optical modulator 610 is analogous to optical modulator 210, 310, 410 and/or 510. Driver 620 is analogous to driver 220. Driver 620 includes interface 622 that is analogous to interface 222. However, driver 620 is a three terminal device. Thus, interface 622 includes only negative lines 632A and 642A and positive line 634A. As indicated previously, negative and positive refers to opposing polarities with respect to a bias.

Optical modulator 610 includes electrode pair 630B including electrodes 632B and 634B, electrode pair 640B including electrodes 642B and 644B, waveguide 650 and waveguide 660 that are analogous to electrode pair 230B including electrodes 232B and 234B, electrode pair 240 including electrodes 242B and 244B, waveguide 250 and waveguide 260, respectively. Electrode pair 630B including electrodes 632B and 634B, electrode pair 640 including electrodes 642B and 644B, waveguide 650 and waveguide 660 are also analogous to electrode pair 330B including electrodes 332B and 334B, electrode pair 340B including electrodes 342B and 344B, waveguide 350 and waveguide 360, respectively. Electrode pair 630B including electrodes 632B and 634B, electrode pair 640 including electrodes 642B and 644B, waveguide 650 and waveguide 660 are also analogous to electrode pair 430B including electrodes 432B and 434B, electrode pair 440B including electrodes 442B and 444B, waveguide 450 and waveguide 460, respectively. Although not depicted, optical modulator 610 may include ground electrodes analogous to electrodes 372, 374, 472 and/or 474.

Optical modulator 610 is also explicitly depicted as including interface 612. Interface 612 is configured to physically and electrically connect with interface 622. However, driver 620 includes three lines, while most of optical modulator 610 utilizes four electrodes. Thus, interface 613 includes three lines to connect to interface 622 of driver 620. In addition, optical modulator 610 includes converter 680. Although shown as part of interface 612, converter 680 may reside elsewhere in optical modulator 610. Converter 680 receives the input electrical signal from positive line 634A. Converter 680 splits the signal, performs other processing desired, and outputs the (split) positive signal on positive electrodes 634B and 644B. Thus, a differential signal (e.g. +V and −V) may be provided on electrode pairs 630B and 640B.

Optical device 600 may have improved performance. Optical device may have benefits analogous to those of optical device 200 and optical modulator(s) 210, 310 and/or 410. For example, optical modulator 610 may allow for use of a low power driver, low optical losses, low microwave losses, an enhanced vπ, improved velocity matching, and/or a larger optical signal modulation may be achieved for a differential driver having a smaller voltage amplitude. Use of a minimum separation (e.g. h) between sections of the ground electrodes (not shown) may reduce reflections and result in less crosstalk. In addition, the architecture has been simplified by the use of a traditional differential driver 620. Thus, performance of optical modulator 610 and optical device 600 may be enhanced.

Although described in the context of particular optical modulators, drivers, and interfaces, the techniques herein may be combined in manners not explicitly depicted and generalized to analogous devices. If, for example, z-cut LN were used for waveguides, the precise locations of electrodes with respect to the waveguides may be adjusted accordingly. Similarly, push-pull modulators and differential drive modulators may utilize techniques such as electrodes having extensions and channel regions, electrodes and waveguides having bending sections, low loss electrodes, low loss waveguides including nonlinear optical material(s) and/or other features described herein may also be provided. Similarly, phase modulators, polarization modulators, amplitude modulators, IQ modulators and/or other optical devices that may be incorporated into devices may be formed in an analogous manner.

Figure 7:
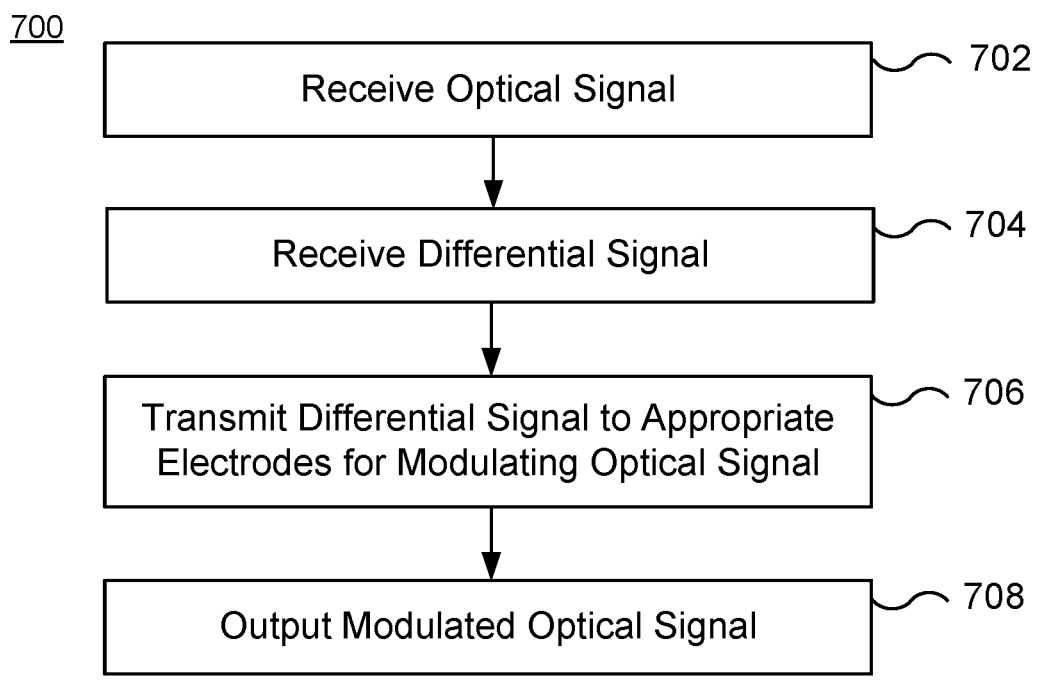
FIG. 7 is a flow-chart depicting an embodiment of a method for modulating an optical signal.

FIG. 7 is a flow chart depicting an embodiment of method 700 for using an optical device that may have improved performance. Thus, method 700 may be used to modulate an optical signal. Method 700 is described in the context of processes that may have sub-processes. Although described in a particular order, another order not inconsistent with the description herein may be utilized. Further, although described in the context of a single optical input and a particular number of differential signals, method 700 may be extended to multiple optical signals and multiple differential signals.

An optical signal is received, at 702. In some embodiments, 702 includes receiving the optical signal at an optical input of an optical modulator utilizing ferroelectric nonlinear optical materials, such as LN. Also at 702, the optical input directs the optical signal to first and second waveguides in the optical modulator.

At least one differential signal is received from a differential driver at an interface of the optical modulator, at 704. Each differential signal includes a positive signal and a negative signal and may be provided by a differential driver.

The differential signal(s) are transmitted to a first pair and a second pair of differential electrodes, at 706. The first differential electrode pair has a first pair negative electrode and a first pair positive electrode arranged on opposing sides of the first waveguide. The first pair negative electrode is arranged on a distal side of the first waveguide relative to the second LN waveguide. The first pair positive electrode is arranged on a proximal side of the first waveguide relative to the second waveguide. The second differential electrode pair has a second pair negative electrode and a second pair positive electrode arranged on opposing sides of the second waveguide. The second pair negative electrode is arranged on a distal side of the second waveguide relative to the first waveguide. The second pair positive electrode is arranged on a proximal side of the second waveguide relative to the first waveguide. Transmitting the signal(s) also includes providing the positive signal to the first pair positive electrode and to the second pair positive electrode and providing the negative signal to the first pair negative electrode and to the second pair negative electrode. Because of the configuration of the pairs of electrodes and the waveguide, the transmitted differential signal is brought into proximity with the first and second waveguides. As a result, the optical signal is modulated. Thus, at 708, the modulated optical signal is output.

For example, method 700 may be used in conjunction with optical device 200. The optical signal from optical signal source 202 is received by optical modulator 210, at 702. Also at 702, the optical signal is transmitted to waveguides 250 and 260. At 704, optical modulator 210 receives a signal from driver 220. More specifically, interface 212 for optical modulator 210 receives the signal from interface 222 of driver 220 over line pairs 230A and 240A. This signal is transmitted to electrode pairs 230B and 240B, at 706. Because of the configuration of waveguides 250 and 260 as well as electrodes 232B, 234B, 242B, and 244B, the differential signal is brought into proximity to waveguides 250 and 260. Thus, the optical signal in waveguides 250 and 260 is modulated. The modulated optical signal is output from optical modulator, at 708.

Using method 700 an optical signal may be modulated using a low power driver, with low optical losses, low microwave losses, an enhanced vπ, and/or improved velocity matching. A larger optical signal modulation may be achieved for a differential driver having a smaller voltage amplitude. Thus, performance of an optical modulator, the optical device including the optical modulator and/or the devices employing the optical device may be improved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An interface to an optical modulator, comprising:
   a first differential line pair having a first differential line pair negative line and a first differential line pair positive line arranged on opposing sides of a first waveguide, wherein the first differential line pair negative line is arranged on a distal side of the first waveguide relative to a second waveguide and the first differential line pair positive line is arranged on a proximal side of the first waveguide relative to the second waveguide, wherein each of the first waveguide and the second waveguide is formed from a thin film of at least one of lithium niobate or lithium tantalate, the thin film having a thickness of not more than two micrometers; and
   a second differential line pair having a second differential line pair negative line and a second differential line pair positive line arranged on opposing sides of the second waveguide, wherein the second differential line pair negative line is arranged on a distal side of the second waveguide relative to the first waveguide and the second differential line pair positive line is arranged on a proximal side of the second waveguide relative to the first waveguide;
   wherein the first waveguide and the first differential line pair in combination with the second waveguide and the second differential line pair provide optical modulation for a frequency bandwidth of 50-100 GHZ;
   a first line coupled to the first differential line pair negative line and to the second differential line pair negative line, the first line being connectable to an output of a differential driver;
   a second line coupled to the first differential line pair positive line and to the second differential line pair positive line, the second line being connectable to another output of the differential driver; and
   wherein the first differential line pair, the second differential line pair, the first waveguide and the second waveguide are on a substrate structure including a substrate and an underlayer on the substrate, the substrate having a substrate microwave dielectric constant, the underlayer having an underlayer dielectric constant less than the substrate microwave dielectric constant such that the substate structure has a total microwave dielectric constant less than eleven in a region of a microwave mode for each line of the first differential line pair and the second differential line pair;
   wherein the first differential line pair negative line and the second differential line pair negative line and the first differential line pair positive line and the second differential line pair positive line have a first impedance difference; and
   wherein the first line and the second line have a second impedance difference configured to compensate for the first impedance difference.

2. The interface of claim 1, further comprising:
   a ground between the first differential line pair positive line and the second differential line pair positive line.

3. The interface of claim 2, further comprising:
   a first ground pair including a first ground and a second ground, the first differential line pair and the second differential line pair between the first ground and the second ground, the first ground pair and the ground being electrically connected.

4. The interface of claim 1, wherein the interface is coupled to the differential driver, differential driver being a single CMOS driver.

5. The interface of claim 4, wherein the differential driver has a positive output and a negative output, the differential driver having a voltage amplitude of not more than two volts.

6. The interface of claim 1, wherein the interface is coupled to the optical modulator.

7. The interface of claim 1, wherein the first waveguide and the second waveguide are configured to transmit an optical signal having a wavelength and wherein the thin film has a thickness of not more than 0.5 multiplied by the wavelength.

8. The interface of claim 7, wherein the first waveguide and the second waveguide each have an optical loss not exceeding 0.5 dB/cm.

9. The interface of claim 7, wherein the optical modulator has a $V\pi$ of not more than 1.5 volts for signals in the 50-100 GHz range.

10. The interface of claim 1, wherein each of the first waveguide and the second waveguide includes at least one bend having a bending radius of less than one millimeter and a bending section optical loss not exceeding 0.5 dB and wherein each of the first differential line pair and the second differential line pair include electrode bending regions.

11. The interface of claim 10, wherein the first waveguide and the second waveguide include a waveguide crossing.

12. The interface of claim 10, wherein the first waveguide, the second waveguide, the first differential line pair and the second differential line pair occupy an area of an integrated circuit not exceeding twenty square millimeters.

13. The interface of claim 10, each of the first differential line pair and the second differential line pair are configured to be driven by a driving voltage having an amplitude of not more than 1.5 volts.

14. The interface of claim 1, wherein each of the second differential line pair positive line and the second differential line pair negative line includes a second channel and a second plurality of extensions, the second plurality of extensions is not more than 2.5 micrometers from the second waveguide, and the second channel is further from the second waveguide than the second plurality of extensions.

15. The interface of claim 14, wherein each of the first differential line pair positive line and the first differential line pair negative line includes a first channel and a first plurality of extensions, wherein each of the second differential line pair positive line and the second differntial line pair negative line includes a second channel and a second plurality of extensions, wherein the first channel is at least five micrometers from the first waveguide and the second channel is at least five micrometers from the second waveguide.

16. The interface of claim 1, wherein the first waveguide and the second waveguide each have sidewalls having a ridge sidewall surface roughness, the sidewalls being formed using a physical etch consisting of at least one of dry etching, reactive ion etching, or inductively coupled plasma reactive ion etching to provide the ridge sidewall surface roughness of not greater than two nanometers.

17. The interface of claim 1, wherein the first differential line pair and the second differential line pair are configured to be driveable by a data signal coupled directly to the interface.

18. An optical modulator, comprising:
a first waveguide;
a second waveguide, each of the first waveguide and the second waveguide being formed from a thin film including at least one of lithium niobate or lithium tantalate, the thin film having a thickness of not more than two micrometers;
a first differential electrode pair having a first pair negative electrode and a first pair positive electrode arranged on opposing sides of the first waveguide, the first pair negative electrode being arranged on a distal side of the first waveguide relative to the second waveguide and the first pair positive electrode being arranged on a proximal side of the first waveguide relative to the second waveguide;
a second differential electrode pair having a second pair negative electrode and a second pair positive electrode arranged on opposing sides of the second waveguide, wherein the second pair negative electrode is arranged on a distal side of the second waveguide relative to the first waveguide and the second pair positive electrode is arranged on a proximal side of the second waveguide relative to the first waveguide;
a first line coupled to the first pair negative electrode and to the second pair negative electrode, the first line being connectable to an output of a differential driver;
a second line coupled to the first pair positive electrode and to the second pair positive electrode, the second line being connectable to another output of the differential driver; and
wherein the first waveguide and the first differential electrode pair in combination with the second waveguide and the second differential electrode pair provide optical modulation for a frequency bandwidth of 50-100 GHZ;
wherein the first waveguide, the second waveguide, the first differential electrode pair and the second differential electrode pair are on a substrate structure including a substrate and an underlayer on the substrate, the substrate having a substrate microwave dielectric constant, the underlayer having an underlayer dielectric constant less than the substrate microwave dielectric constant such that the substate structure has a total microwave dielectric constant less than eleven in a region of a microwave mode for each electrode of the first differential electrode pair and the second differential electrode pair;
wherein the first pair negative electrode and the second pair negative electrode and the first pair positive electrode and the second pair positive line have a first impedance difference; and
wherein the first line and the second line have a second impedance difference configured to compensate for the first impedance difference.

19. The optical modulator of claim 18, further comprising:
a ground between the first pair positive electrode and the second pair positive electrode.

20. The optical modulator of claim 19, further comprising:
a first ground pair including a first ground and a second ground, the first differential electrode pair and the second differential electrode pair between the first ground and the second ground, the first ground pair and the ground being electrically connected.

21. The optical modulator of claim 19, wherein the ground includes a first section, a bending section, and a second section, the bending section being between the first section and the second section, the first section and the second section being separated by a distance of at least one micrometer.

22. The optical modulator of claim 21, wherein the distance is at least ten micrometers.

23. The optical modulator of claim 18, wherein the optical modulator is coupled to a differential driver having a positive output and at least one negative output, the differential driver having a voltage amplitude of not more than two volts.

24. The optical modulator of claim 23, wherein the voltage amplitude is not more than one volt.

25. The optical modulator of claim 23, wherein the differential driver is a CMOS driver.

26. The optical modulator of claim 18, further comprising:
an interface including a converter, the first differential electrode pair and the second differential electrode pair being connectable to a differential driver having a plurality of outputs, the first differential electrode pair and the second differential electrode pair having impedances matching corresponding impedances of the plurality of outputs to within twenty percent.

27. A method, comprising:
receiving an optical signal at an optical input of an optical modulator, the optical input directing the optical signal to a first waveguide and a second waveguide, each of the first waveguide and the second waveguide being formed from a thin film of at least one of lithium niobate or lithium tantalate, the thin film having a thickness of not more than two micrometers;
receiving a differential signal at an interface of the optical modulator, the differential signal including a positive signal and at least one negative signal;
transmitting the differential signal to a first differential electrode pair and a second differential electrode pair, the first differential electrode pair having a first pair negative electrode and a first pair positive electrode arranged on opposing sides of the first waveguide, the first pair negative electrode being arranged on a distal side of the first waveguide relative to the second waveguide and the first pair positive electrode being arranged on a proximal side of the first waveguide relative to the second waveguide, the second differential electrode pair having a second pair negative electrode and a second pair positive electrode arranged on opposing sides of the second waveguide, wherein the second pair negative electrode is arranged on a distal side of the second waveguide relative to the first waveguide and the second pair positive electrode is arranged on a proximal side of the second waveguide relative to the first waveguide, a first line being coupled to the first pair negative electrode and to the second pair negative electrode, the first line being connectable to an output of a differential driver, a second line being coupled to the first pair positive electrode and to the second pair positive electrode, the second line being connectable to another output of the differential driver;
the transmitting further including
providing the positive signal to the first pair positive electrode and to the second pair positive electrode, the providing the positive signal further including converting the positive signal into a first positive signal for the first pair positive electrode a second positive signal for the second pair positive electrode; and
providing the at least one negative signal to the first pair negative electrode and to the second pair negative electrode;
wherein the first waveguide and the first differential electrode pair in combination with the second waveguide and the second differential electrode pair provide optical modulation for a frequency bandwidth of 50-100 GHZ;
wherein the first waveguide, the second waveguide, the first differential electrode pair and the second differential electrode pair are on a substrate structure including a substrate and an underlayer on the substrate, the substrate having a substrate microwave dielectric constant, the underlayer having an underlayer dielectric constant less than the substrate microwave dielectric constant such that the substate structure has a total microwave dielectric constant less than eleven in a region of a microwave mode for each electrode of the first differential electrode pair and the second differential electrode pair;
wherein the first pair negative electrode and the second pair negative electrode and the first pair positive electrode and the second pair positive electrode have a first impedance difference; and
wherein the first line and the second line have a second impedance difference configured to compensate for the first impedance difference.

28. An interface to an optical modulator, comprising:
a first differential line pair having a first differential line pair negative line and a first differential line pair positive line arranged on opposing sides of a first waveguide, wherein the first differential line pair negative line is arranged on a distal side of the first waveguide relative to a second waveguide and the first differential line pair positive line is arranged on a proximal side of the first waveguide relative to the second waveguide, wherein each of the first waveguide and the second waveguide is formed from a thin film of at least one of lithium niobate or lithium tantalate, the thin film having a thickness of not more than two micrometers; and
a second differential line pair having a second differential line pair negative line and a second differential line pair positive line arranged on opposing sides of the second waveguide, wherein the second differential line pair negative line is arranged on a distal side of the second waveguide relative to the first waveguide and the second differential line pair positive line is arranged on a proximal side of the second waveguide relative to the first waveguide, the first waveguide and the first differential line pair in combination with the second waveguide and the second differential line pair provide optical modulation for a frequency bandwidth of 50-100 GHZ;
a first line coupled to the first differential line pair negative line and to the second differential line pair negative line, the first line being connectable to an output of a differential driver; and
a converter configured to convert a positive input line to the first differential line pair positive line and the second differential line pair positive line, such that a positive signal provided to the interface by the positive input line is converted into a first positive signal for the first differential line pair positive line and a second positive signal for the second differential line pair positive line, the converter including a second line coupled to the first differential line pair positive line and to the second differential line pair positive line, the second line being connectable to another output of the differential driver;
wherein the first differential line pair negative line and the second differential line pair negative line and the first differential line pair positive line and the second differential line pair positive line have a first impedance difference and wherein the first line and the second line have a second impedance difference configured to compensate for the first impedance difference.

\* \* \* \* \*